United States Patent
Eshita

(10) Patent No.: US 9,723,196 B2
(45) Date of Patent: Aug. 1, 2017

(54) IMAGING DEVICE AND ASSOCIATED METHODOLOGY FOR ESTABLISHING A WI-FI CONNECTION WITH ANOTHER DEVICE

(71) Applicant: Sony Corporation, Minato-ku (JP)

(72) Inventor: Shiro Eshita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/182,851

(22) Filed: Feb. 18, 2014

(65) Prior Publication Data

US 2015/0049206 A1    Feb. 19, 2015

(30) Foreign Application Priority Data

Aug. 19, 2013    (JP) ................................ 2013-169727
Aug. 20, 2013    (JP) ................................ 2013-170487

(Continued)

(51) Int. Cl.
     *H04N 5/225*      (2006.01)
     *H04N 5/232*      (2006.01)
(Continued)

(52) U.S. Cl.
CPC ....... *H04N 5/23209* (2013.01); *H04B 5/0031* (2013.01); *H04M 1/7253* (2013.01);
(Continued)

(58) Field of Classification Search
CPC .................... H04N 21/41407; H04N 21/47217
(Continued)

(56) References Cited

U.S. PATENT DOCUMENTS 4,807,186 A *    2/1989    Ohnishi et al. ................. 714/48
6,101,339 A      8/2000    Miki et al.
(Continued)

FOREIGN PATENT DOCUMENTS

CN        1746763 A      3/2006
CN    101322640 A    12/2008
(Continued)

OTHER PUBLICATIONS

Sony; Help Guide—Connecting the camera nad an NFC-enabled Andriod smartphone via Wi-Fi; 2013; sony-asia.com; http://www.sony-asia.com/microsite/cybershot_userguides/DSC-QX100/en/contents/TP0000226084.html.*

(Continued)

*Primary Examiner* — Gary C Vieaux
(74) *Attorney, Agent, or Firm* — Oblon, McClelland, Maier & Neustadt, L.L.P.

(57) ABSTRACT

An imaging device includes a non-contact communication unit and a control unit. The non-contact communication unit performs non-contact communication with an external device. The control unit controls turning ON/OFF power and an imaging preparation operation of the imaging device. The control unit performs control of turning ON power of the imaging device when detecting a polling command which is transmitted from the external device by the non-contact communication, of transmitting connection information regarding wireless communication connection with the external device to the external device after the power is turned ON, and of performing the imaging preparation operation when transmission of the connection information is completed.

16 Claims, 16 Drawing Sheets

(30) Foreign Application Priority Data

Aug. 23, 2013 (JP) ................................ 2013-173891
Sep. 17, 2013 (JP) ................................ 2013-192269
Jan. 28, 2014 (JP) ................................ 2014-013384

(51) Int. Cl.
H04M 1/725 (2006.01)
H04B 5/00 (2006.01)

(52) U.S. Cl.
CPC ......... *H04N 5/2251* (2013.01); *H04N 5/2254* (2013.01); *H04N 5/23203* (2013.01); *H04N 5/23241* (2013.01); *H04M 2250/04* (2013.01)

(58) Field of Classification Search
USPC .................................................. 348/207.11
See application file for complete search history.

(56) References Cited

U.S. PATENT DOCUMENTS

| | | | |
|---|---|---|---|
| 6,246,832 B1* | 6/2001 | Terada | 396/63 |
| 6,400,903 B1* | 6/2002 | Conoval | 396/56 |
| 7,852,503 B2* | 12/2010 | Iwami et al. | 358/1.15 |
| 8,116,476 B2* | 2/2012 | Inohara | H04R 5/04 348/E5.099 |
| 8,140,010 B2* | 3/2012 | Symons et al. | 455/41.1 |
| 8,621,126 B2* | 12/2013 | Sueyoshi et al. | 710/109 |
| 8,704,944 B1* | 4/2014 | Wierzoch | H04N 5/2251 348/207.99 |
| 9,386,666 B2* | 7/2016 | Economy | H05B 37/0272 |
| 9,451,143 B2* | 9/2016 | Shinozaki | H04N 1/2112 |
| 2004/0189850 A1 | 9/2004 | Chang | |
| 2005/0038680 A1* | 2/2005 | McMahon | A61B 5/0022 705/3 |
| 2005/0221858 A1* | 10/2005 | Hoddie | 455/557 |
| 2006/0233545 A1 | 10/2006 | Senba et al. | |
| 2006/0262154 A1* | 11/2006 | Uchiyama | B41J 29/393 347/19 |
| 2007/0058972 A1 | 3/2007 | Misawa | |
| 2007/0098385 A1 | 5/2007 | Tanaka et al. | |
| 2007/0109417 A1* | 5/2007 | Hyttfors et al. | 348/211.99 |
| 2009/0084040 A1 | 4/2009 | Kondo et al. | |
| 2010/0022188 A1 | 1/2010 | Nakagawa | |
| 2010/0068996 A1* | 3/2010 | Haartsen | 455/41.1 |
| 2010/0208434 A1 | 8/2010 | Kim et al. | |
| 2011/0086632 A1* | 4/2011 | Tumey et al. | 455/421 |
| 2011/0115932 A1* | 5/2011 | Shin et al. | 348/211.4 |
| 2012/0096561 A1* | 4/2012 | Sugiyama | 726/26 |
| 2012/0100807 A1* | 4/2012 | Nakagawa | 455/41.2 |
| 2012/0169854 A1* | 7/2012 | Seo | H04N 13/0438 348/56 |
| 2012/0280530 A1 | 11/2012 | Nemoto | |
| 2012/0307079 A1 | 12/2012 | Yumiki et al. | |
| 2013/0107062 A1* | 5/2013 | Okazaki | 348/207.1 |
| 2013/0141640 A1 | 6/2013 | Kim et al. | |
| 2013/0342650 A1* | 12/2013 | Shaw et al. | 348/46 |
| 2014/0012510 A1* | 1/2014 | Mensinger et al. | 702/19 |
| 2014/0099889 A1* | 4/2014 | Seo et al. | 455/41.1 |
| 2014/0132781 A1* | 5/2014 | Adams et al. | 348/207.1 |
| 2014/0215218 A1* | 7/2014 | Brands | 713/172 |
| 2015/0119019 A1* | 4/2015 | Minichmayr | 455/420 |

FOREIGN PATENT DOCUMENTS

| | | |
|---|---|---|
| CN | 101674407 A | 3/2010 |
| CN | 201992281 U | 9/2011 |
| CN | 102314045 A | 1/2012 |
| CN | 202353661 U | 7/2012 |
| CN | 102833374 A | 12/2012 |
| CN | 102867473 A | 1/2013 |
| CN | 103108120 A | 5/2013 |
| CN | 203896426 U | 10/2014 |
| CN | 203896427 U | 10/2014 |
| JP | 61-59974 | 3/1986 |
| JP | 62-62667 | 3/1987 |
| JP | 7-199031 A | 8/1995 |
| JP | 9-134610 | 5/1997 |
| JP | 11-298770 | 10/1999 |
| JP | 2000-224449 | 8/2000 |
| JP | 2003-156790 | 5/2003 |
| JP | 2003-319232 | 11/2003 |
| JP | 2005-164845 | 6/2005 |
| JP | 2005-341119 | 12/2005 |
| JP | 2006-41952 | 2/2006 |
| JP | 2006-78738 | 3/2006 |
| JP | 2006-128933 | 5/2006 |
| JP | 2006-237774 | 9/2006 |
| JP | 2006-295838 | 10/2006 |
| JP | 2007-78827 | 3/2007 |
| JP | 2007-101886 A | 4/2007 |
| JP | 2007-110314 | 4/2007 |
| JP | 2007-279485 | 10/2007 |
| JP | 2007-279486 | 10/2007 |
| JP | 2007-306433 | 11/2007 |
| JP | 2007-312297 | 11/2007 |
| JP | 2008-193457 | 8/2008 |
| JP | 2008-271151 | 11/2008 |
| JP | 2009-207069 | 9/2009 |
| JP | 2010-45689 | 2/2010 |
| JP | 2010-160286 | 7/2010 |
| JP | 2010-171607 | 8/2010 |
| JP | 2010-232827 | 10/2010 |
| JP | 2011-182449 | 9/2011 |
| JP | 2011-259065 | 12/2011 |
| JP | 2012-128347 | 7/2012 |
| JP | 2012-185397 | 9/2012 |
| JP | 2013-157737 | 8/2013 |
| JP | 2013-257518 | 12/2013 |
| JP | 2014-011229 | 1/2014 |
| JP | 2014-011231 | 1/2014 |
| WO | WO 2004/054241 A1 | 6/2004 |
| WO | WO 2012/115253 A1 | 8/2012 |
| WO | WO 2013/111538 A1 | 8/2013 |
| WO | WO 2013181682 A1 * | 12/2013 |

OTHER PUBLICATIONS

Raymond Wong; "Sony's lens-shaped cameras works with any smartphone"; Sep. 4, 2013; dvice.com; http://www.dvice.com/2013-9-4/sonys-lens-shaped-cameras-works-any-smartphone.*

Laura Hicks; "Sony Introduces NEX-5T with Wi-Fi and NFC"; Aug. 27, 2013; DigitalCameraReview.com; http://www.digitalcamerareview.com/default.asp?newsID=5385.*

Peijko, Pawel; "Android app lets you remotely control a DSLR camera"; Aug. 5, 2011; www.gizmag.com.*

Rossbacher, Andreas; "WifiTap WiFi NFC"; Dec. 1, 2013; play.google.com/store/apps.*

Rehman, A.; "Control the Camera of One Android or iOS Device Using Another With Remote Shot"; Oct. 18, 2012; www.addictivetips.com/remote-shot-control-camera-of-one-android-ios-device-using-another/.*

Dang, et al; "Simplify embedded Wi-Fi connectivity with Near-Field Communications"; Sep. 7, 2012; www.embedded.com.*

Skjolberg, Thomas; "Overview NFC/NDEF"; Mar. 7, 2013; nfc-eclipse-plugin; https://code.google.com/p/nfc-eclipse-plugin/.*

Frenzel, Lou; "NFC Lets You Leave Your Cash and Credit Cards at Home"; Sep. 12, 2012; http://electronicdesign.com/energy.nfc-lets-you-leave-your-cash-and-credit-cards-home; pp. 1-11.*

Online Manual, "Support for Cyber-shot™ Lens-style Camera" DSC-QX100, Sep. 24, 2013, 1 page.

LSC Camera Initial Press Release, "Get set for a whole new photo experience" Sep. 4, 2013, 1 page.

Office Action issued Dec. 25, 2014 in Chinese Patent Application No. 201410217107.1 (with English-language Translation).

Office Action issued Jan. 16, 2015 in Chinese Patent Application No. 201410218796.8 (with English-language Translation).

Combined Chinese Office Action and Search Report issued Oct. 10, 2014, in Chinese Patent Application No. 201410218796.8 with English translation.

(56) References Cited

OTHER PUBLICATIONS

International Search Report mailed Nov. 11, 2014 in PCT/JP2014/070889 filed Aug. 7, 2014 (with English-language Translation).
Office Action issued Jan. 26, 2015, in Chinese Patent Application No. 201410235014.1 (with English-language Translation).
Search Report issued Feb. 19, 2015, in European Patent Application No. 14166053.0.
Search Report issued Feb. 24, 2015, in European Patent Application No. 14166054.8.
Office Action issued Mar. 2, 2015, in Chinese Patent Application No. 201410217273.1 (with English-language Translation).
European Search Report issued Mar. 24, 2015, in European Patent Application No. 14166056.3.
European Search Report issued Apr. 24, 2015, in European Patent Application No. 14166057.1.
Evaluation Report of Utility Model Patent completed on Jan. 23, 2015 in Chinese Patent No. ZL2014202867685 (with English language translation).
Office Action issued Sep. 14, 2015 in Chinese Patent Application No. 201410217273.1 (with English-language Translation).
Office Action issued Sep. 30, 2015 in Chinese Patent Application No. 201410235014.1 (with English-language Translation).
Office Action issued Oct. 5, 2015 in European Patent Application No. 14 166 053.0.
European Office Action issued Nov. 6, 2015 in Patent Application No. 14 166 056.3.
Office Action issued May 3, 2016 in European Patent Application No. 14 166 054.8.
Office Action issued Jun. 7, 2016 in European Patent Application No. 14 166 056.3.
Office Action dated Mar. 29, 2017 in European Patent Application No. 14 166 054.8.
Office Action dated Mar. 18, 2014 in Japanese Patent Application No. 2014-011229 (with English-language Translation).
Office Action dated Mar. 18, 2014 in Japanese Patent Application No. 2014-011230 (with English-language Translation).
Office Action dated Mar. 18, 2014 in Japanese Patent Application No. 2014-011231 (with English-language Translation).

* cited by examiner

FIG. 1
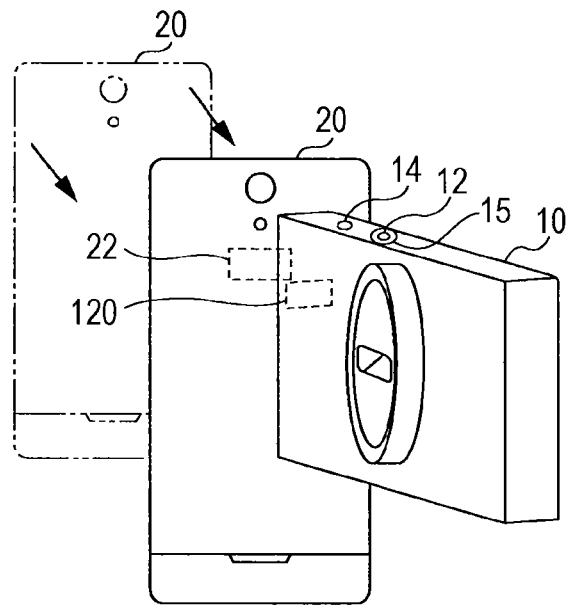
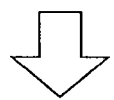
TRANSMISSION OF CONNECTION INFORMATION AND THE LIKE HAS BEEN COMPLETED
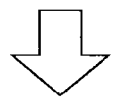
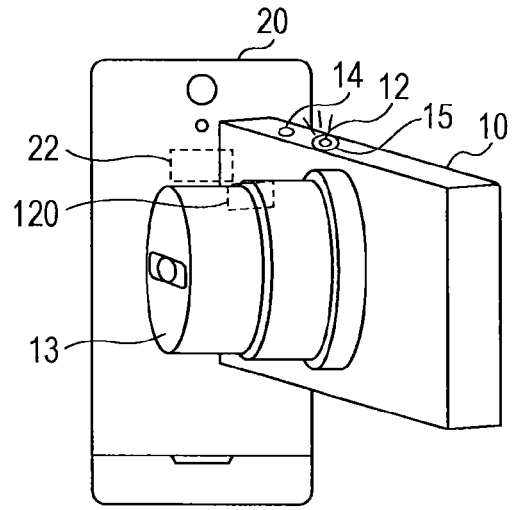

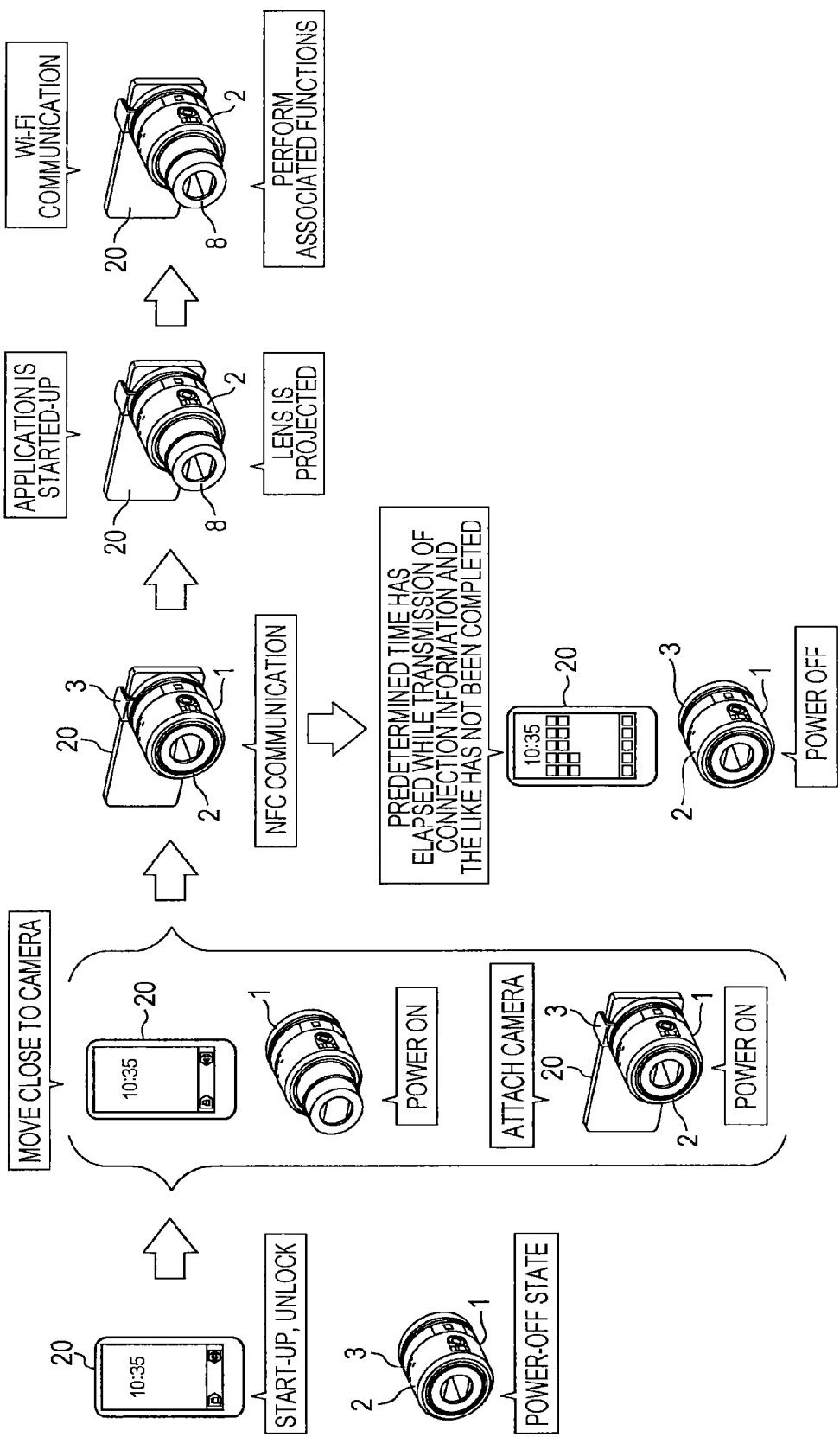

IMAGING DEVICE AND ASSOCIATED METHODOLOGY FOR ESTABLISHING A WI-FI CONNECTION WITH ANOTHER DEVICE

CROSS REFERENCE TO RELATED APPLICATIONS

This application claims the benefit of Japanese Priority Patent Application JP 2013-170487 filed Aug. 20, 2013, Japanese Priority Patent Application JP 2013-169727 filed Aug. 19, 2013, Japanese Priority Patent Application JP 2013-173891 filed Aug. 23, 2013, Japanese Priority Patent Application JP 2013-192269 filed Sep. 17, 2013, and Japanese Priority Patent Application JP 2014-013384 filed Jan. 28, 2014, the entire contents of each of which are incorporated herein by reference.

BACKGROUND

The present disclosure relates to an imaging device, a control method, and a program.

In recent years, video camera apparatuses having functions which are remotely controlled have been proposed. For example, Japanese Unexamined Patent Publication No. 8-331434 proposes a video camera apparatus that takes an image data in accordance with an image data signal transmitted from a remote controller by wireless communication and transmits the taken image data to a remote controller.

Further, a system is proposed which performs wireless communication with a digital camera and performs remote imaging control of the digital camera by using an information processing terminal (a smart phone or a mobile phone terminal) which implements an application having a function capable of performing imaging control from a remote site.

SUMMARY

However, a system which performs remote control of a digital camera by using the information processing terminal described above is necessary to perform a power-ON operation of the digital camera, an application start operation of the information processing terminal, and wireless communication connection operations of the digital camera and the information processing terminal, and the like, so that it takes an effort.

Therefore, the present disclosure proposes an imaging device, a control method, and a program, capable of performing automatically power-ON control according to non-contact communication and of performing an imaging preparation operation after transmission of connection information for wireless communication connection is completed.

According to an embodiment of the present disclosure, there is provided an imaging device including: a non-contact communication unit that performs non-contact communication with an external device; and a control unit that controls turning ON/OFF power and an imaging preparation operation of the imaging device, in which the control unit performs control of turning ON the power of the imaging device when detecting a polling command which is transmitted from the external device by the non-contact communication, of transmitting connection information regarding wireless communication connection with the external device to the external device after the power is turned ON, and of performing the imaging preparation operation when transmission of the connection information is completed.

According to another embodiment of the present disclosure, there is provided a control method including: detecting a polling command which is transmitted from an external device by non-contact communication; performing control of turning ON power of an imaging device when the polling command is detected; transmitting connection information regarding wireless communication connection with the external device to the external device after the power of the imaging device is turned ON; and controlling a processor so as to perform an imaging preparation operation when transmission of the connection information is completed.

According to still another embodiment of the present disclosure, there is provided a program causing a computer to function as: a non-contact communication unit that performs non-contact communication with an external device; and a control unit that controls turning ON/OFF power and an imaging preparation operation of an imaging device, in which the control unit performs control of turning ON power of the imaging device when detecting a polling command which is transmitted from the external device by the non-contact communication, of transmitting connection information regarding wireless communication connection with the external device to the external device after the power is turned ON, and of performing the imaging preparation operation when transmission of the connection information is completed.

According to the present disclosure as described above, it is possible to perform automatically control of turning ON the power according to the non-contact communication and to perform an imaging preparation operation after transmission of connection information regarding wireless communication connection is completed.

In addition, the above effect is not intended to be necessarily limited, and together with the effect described above, or in place of the effect, any effect set forth herein or other effects that can be understood from the present specification may be achieved.

BRIEF DESCRIPTION OF THE DRAWINGS

FIG. 1 is a diagram describing an overview of a digital camera according to an embodiment of the present disclosure;

FIG. 19 is a state transition diagram describing a series of operations in another embodiment.

DETAILED DESCRIPTION OF EMBODIMENTS

Figure 2:
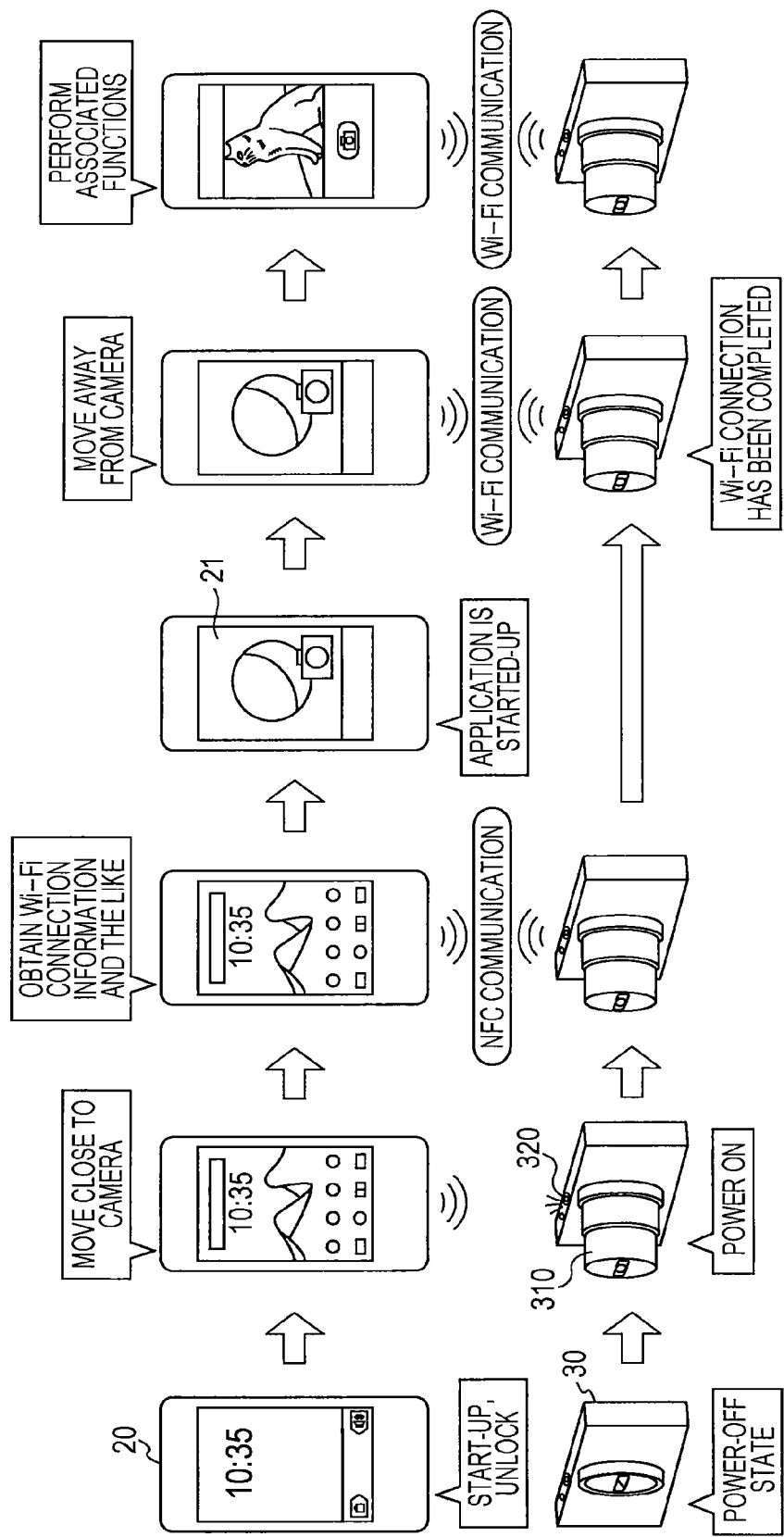
FIG. 2 is a state transition diagram describing a flow of a series of operations between a digital camera and a communication terminal.

Hereinafter, preferred embodiments of the present disclosure will be described in detail with reference to the accompanying drawings. Further, components having substantially the same functional structure in the present specification and drawings are denoted by the same reference numerals, and thus the repeated descriptions thereof will be omitted.

Further, it is assumed that the description will be given in the following order.

1. Overview of digital camera according to an embodiment of the present disclosure
2. Basic configuration
3. Operation process
3-1. Operation process of digital camera
3-2. Operation process of control system
4. Other embodiments
5. Conclusion

1. Overview of Digital Camera According to an Embodiment of the Present Disclosure First, an overview of a digital camera according to an embodiment of the present disclosure will be described with reference to FIG. 1. The digital camera 10 shown in FIG. 1 is an example of an imaging device according to the present disclosure. The imaging device according to the present disclosure is not limited to the digital camera 10, but rather may be a digital video camera.

A power button 15 and a shutter button 14 are provided on an upper surface of the digital camera 10. Further, a power lamp 12 is integrally provided in the power button 15. The power lamp 12 turned on notifies the user of the fact that the digital camera 10 is in a power-ON state.

Further, a NFC communication unit (NFC tag) 120 performing Near Field Communication (NFC) is installed in the digital camera 10 and performs non-contact communication with a NFC communication unit installed in an adjacent external device. In the example shown in FIG. 1, when a communication terminal 20 such as a smart phone is moved close to the digital camera 10, non-contact communication is performed between a NFC communication unit 22 installed in the communication terminal 20 and the NFC communication unit 120 of the digital camera 10.

The NFC communication unit 22 installed in the communication terminal 20 performs NFC communication with the approaching digital camera 10 in cooperation with a NFC antenna. Specifically, the NFC communication unit 22 transmits radio waves reaching a short distance of about a few cm to 10 cm, or about 7 mm depending on a design, and drives a NFC antenna 121 (see FIG. 4) of the digital camera 10 present within the radio wave reachable range so as to perform NFC communication with the digital camera 10.

As shown in FIG. 1, if the communication terminal 20 is moved close to the digital camera 10 in a power-OFF state, power of the digital camera 10 is turned on (power ON) and the digital camera started according to the NFC communication. Then, the digital camera 10 performs wireless communication connection such as Wireless Fidelity (Wi-Fi) in response to a request from the communication terminal 20, a predetermined application is started in the communication terminal 20, and an associated function between the digital camera 10 and the communication terminal 20 is performed.

Background

Here, problems in the flow of a series of operations from the power-ON of the digital camera 10 to the execution of the associated function will be described with reference to FIGS. 2 and 3.

FIG. 2 is a state transition diagram describing the flow of the series of operations between the digital camera 30 according to a comparative example and the communication terminal 20. As shown in FIG. 2, if the communication terminal 20 which is unlocked and already started is moved close to the digital camera 30 in a power-OFF state, the power of the digital camera 30 is turned on (power ON) by NFC communication. Generally, as shown in FIG. 2, at the timing when the power is turned ON, the digital camera 30 performs an imaging preparation operation such as projecting of a collapsible lens 310 or turning ON of the power lamp 320.

Then, the communication terminal 20 which is close to the digital camera 30 acquires connection information (information such as an ID and a PassKey) for performing wireless communication connection such as Wi-Fi and information regarding an application to be started (package name or the like) from the digital camera 30 by NFC communication.

The communication terminal 20 starts a predetermined application based on the application information acquired from the digital camera 30, and a start-up screen of the application is displayed on a display unit 21.

Subsequently, when Wi-Fi communication connection is completed based on the connection information acquired from the digital camera 30, even if the communication terminal 20 moves away from the digital camera 30, the communication terminal 20 performs an associated function between the communication terminal 20 and the digital camera 30 by Wi-Fi communication. An example of the associated function includes a remote imaging control function for the digital camera 30, a function of displaying a through image or a taken image acquired in the digital camera 30 on the communication terminal 20, and the like. After the user places the digital camera 30 facing the user, for example, at a position away from the user and confirms a through image displayed on the display unit 21 of the communication terminal 20, the user taps an image taking button displayed on the display unit 21, thereby performing an image taking execution at the remote site.

In this manner, a series of operations including power-ON control of the digital camera 30, start-up of the application, connection establishment of Wi-Fi communication, and execution of the associated function are automatically performed simply by the user moving the communication terminal 20 close to the digital camera 30.

However, when such a series of operations are performed, if the communication terminal 20 is moved away from the digital camera 30 during the NFC communication, there is a problem in that the connection fails. Hereinafter, this will be described with reference to FIG. 3.

Figure 3:
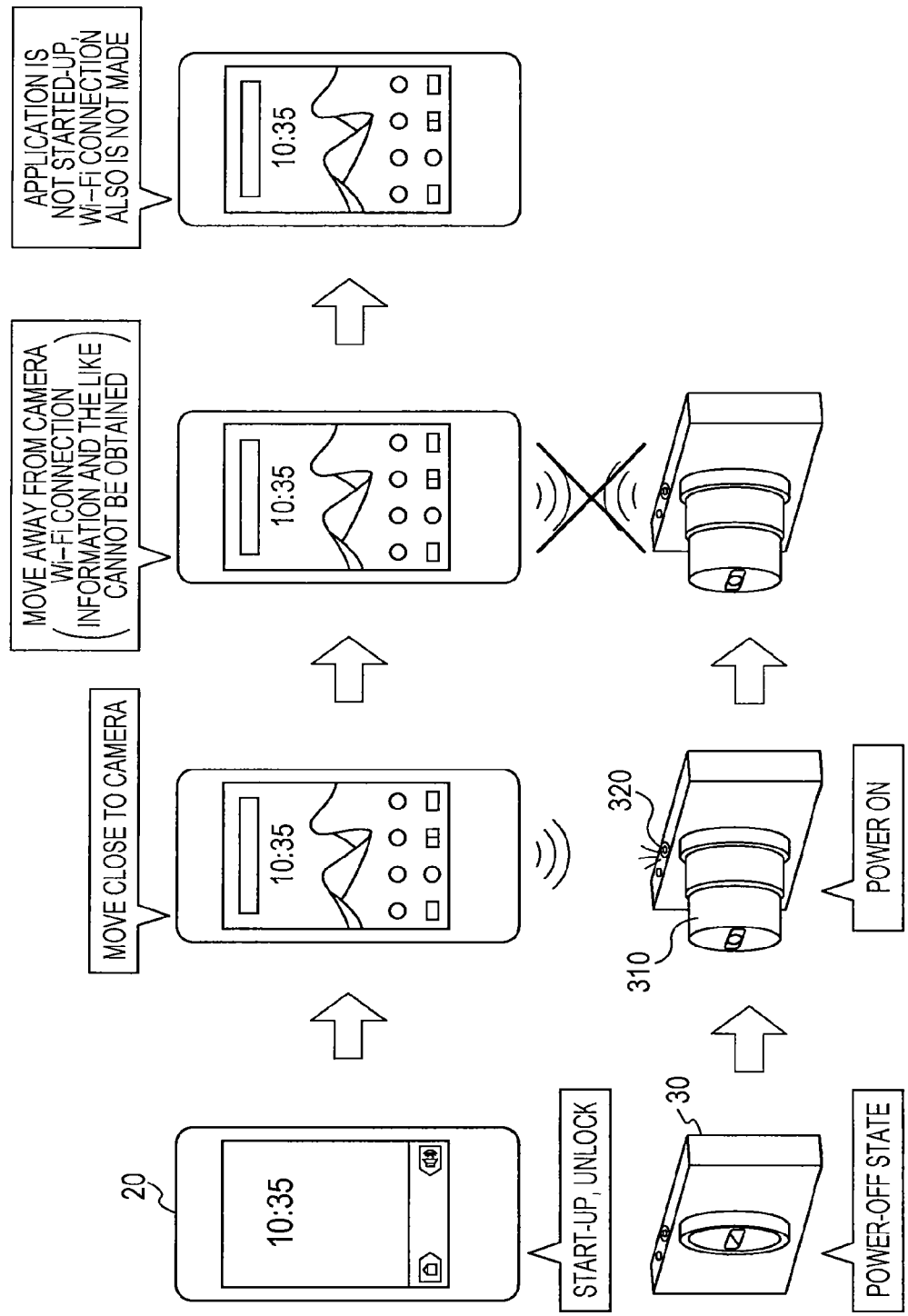
FIG. 3 is a state transition diagram describing a case where the communication terminal is moved away during a connection process.

FIG. 3 is a state transition diagram describing a case where the communication terminal 20 is moved away from the digital camera 30 during a connection process. As shown in FIG. 3, if the communication terminal 20 is moved close to the digital camera 30 and the power of the digital camera 30 is turned ON, the collapsible lens 310 projects or the power lamp 320 is turned ON, so that there is a concern that the user understands that the connection process is successful and moves the communication terminal 20 away from the digital camera 30. If the communication terminal 20 is moved away from the digital camera 30, the NFC communication may not be performed and thus the communication terminal 20 may not acquire connection information necessary for Wi-Fi communication connection and information regarding an application to be started.

As a result, the application is not started, Wi-Fi connection is not made, and the associated function is not performed in the communication terminal 20.

Thus, in view of the above fact, as shown in FIG. 1, if the communication terminal 20 is moved close to the digital camera 10, the digital camera 10 according to the present embodiment performs power-ON control according to the NFC communication, but does not perform the imaging preparation operation such as projecting the collapsible lens 13 or turning ON the power lamp 12. As shown in FIG. 1, after the power-ON control is performed and then the transmission of connection information necessary for connection establishment of Wi-Fi communication and the like is completed, the digital camera 10 according to the present embodiment performs the imaging preparation operation such as projecting the collapsible lens 13 or turning ON the power lamp 12. After the transmission of Wi-Fi connection information is completed, even if the communication terminal 20 is moved away from the digital camera 30, information necessary for application start-up and Wi-Fi connection has been already acquired from the digital camera 30, and the communication terminal 20 can continue to perform a series of operations.

Hitherto, the overview of the digital camera 10 according to an embodiment of the present disclosure has been described. Subsequently, the basic configuration of the digital camera 10 according to the present disclosure will be described with reference to FIG. 4.

2. Basic Configuration

Figure 4:
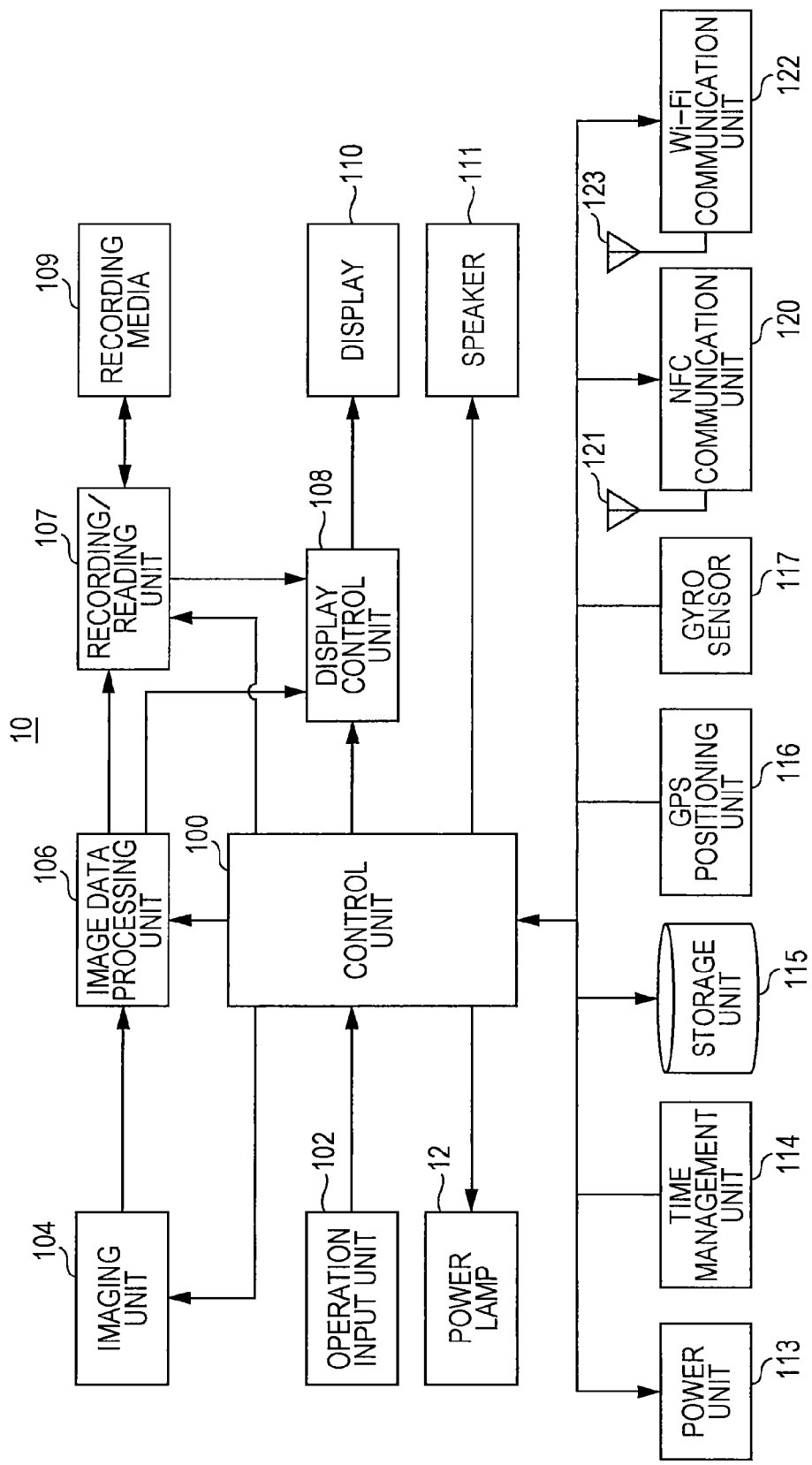
FIG. 4 is a block configuration diagram showing an example of a basic configuration of the digital camera according to the present embodiment.

FIG. 4 is a block configuration diagram showing an example of a basic configuration of the digital camera 10 according to the present embodiment. As shown in FIG. 4, the digital camera 10 includes a control unit 100, an operation input unit 102, a power lamp 12, an imaging unit 104, an image data processing unit 106, a recording and reading unit 107, a recording medium 109, a display unit 110, a speaker 111, a power unit 113, a time management unit 114, a storage unit 115, a GPS positioning unit 116, a gyro sensor 117, a NFC communication unit 120, and a Wi-Fi communication unit 122.

Control Unit

The control unit 100 controls respective components included in the digital camera 10. For example, as shown in FIG. 4, the control unit 100 outputs a control signal in response to an operation signal which is output from the operation input unit 102, to respective components, and performs imaging control, image data processing control, recording control, display control, and the like. Further, the control unit 100 according to the present embodiment functions also as a communication control unit which controls the NFC communication unit 120 and the Wi-Fi communication unit 122.

Further, the control unit 100 according to the present embodiment outputs a power control signal to the power unit 113, and switches power ON/OFF in the digital camera 10. Specifically, when the NFC communication unit 120 detects a wireless signal of a NFC bandwidth corresponding to a Polling Command from an external device, the control unit 100 performs power-ON control. Then, after the power is turned ON, connection information (such as an ID or a PassKey) for wireless communication (for example, Wi-Fi communication) connection with an external device (for example, a communication terminal 20) is transmitted from the NFC communication unit 120 to the external device. Then, when the transmission of the connection information is completed, the control unit 100 controls the digital camera 10 so as to perform the imaging preparation operation.

In the present specification, the imaging preparation operation is an operation involved with the change in the appearance of the digital camera 10 or an operation involved with start-up notification to the user. Specifically, the imaging preparation operation involved with the change in the appearance is, for example, a driving operation to project the collapsible lens 13. Further, the imaging preparation operation involved with the start-up notification to the user is, for example, an operation of reproducing start-up sound from the speaker 111, and a light emission operation of the power lamp 12. Thus, since the collapsible lens 13 does not project prior to completion of the transmission of the connection information, it is possible to prevent the user from understanding that the connection is successful and moving the communication terminal 20 away from the digital camera 10 during the Wi-Fi connection process.

Further, the control unit 100 controls the NFC communication unit 120 so as to transmit the connection information and information (for example, package name) for designating an application to be started in an external device.

After the power of the digital camera 10 is turned ON, when the transmission of the connection information is not completed within a predetermined time, the control unit 100 performs control of turning OFF the power of the digital camera 10.

Further, instead of detecting the wireless signal corresponding to the Polling Command from the external device, when it is detected that the power button 15 shown in FIG. 1 is pressed by the user, the control unit 100 performs the power-ON control of the digital camera 10 as usual and controls the digital camera 10 so as to perform an imaging preparation operation.

Operation Input Unit

The operation input unit 102 detects an operation input by the user and outputs the detected operation input as an operation signal to the control unit 100. The operation input unit 102 may be physically configured buttons (a shutter button 14, a power button 15, a mode switch, an operation lever, and the like), or may be a touch panel that detects a touch operation on an operation screen.

Imaging Unit

The imaging unit 104 is a signal conversion unit such as a Charge Coupled Device (CCD) or a Complementary Metal Oxide Semiconductor (CMOS), and an object image is formed by an optical system. An imaging lens included in the optical system may be a collapsible lens 13 shown in FIG. 1. If the object image is formed by the signal conversion unit, the object image is converted into an electric image data by the signal conversion unit. Further, the image data (taken image data) converted by the imaging unit 104 is transmitted to the display unit 110 and the recording medium 109 through the image data processing unit 106, or the like.

Image Data Processing Unit

The image data processing unit 106 processes an image data (taken image data) which is output from the imaging unit 104. The image data processing unit 106 performs, for example, noise removal, color correction, edge detection, or the like, as necessary. Further, the image data processing unit 106 outputs the image data (taken image data) which is output from the imaging unit 104 to the display control unit 108 and/or the recording and reading unit 107.

Display Control Unit

The display control unit 108 generates a screen to be displayed on the display unit 110 and controls the display of the display unit 110. For example, the display control unit 108 performs a generation of a display screen and a display control in response to the control signal which is output from the control unit 100. Further, the display control unit 108 controls the display unit 110 so as to display a taken image which is output from the image data processing unit 106 and a taken image data which is output from the recording and reading unit 107 on the display unit 110.

Display Unit

The display unit 110 is, for example, a display device such as a liquid crystal display (LCD) device and an Organic Light Emitting Diode (OLED) device.

Recording and Reading Unit

For example, the recording and reading unit 107 records an image data (taken image data) which is output from the image data processing unit 106 according to a timing of pressing the shutter button 14 on the recording medium 109, or reads the taken image data which is recorded on the recording medium 109. Further, the recording and reading unit 107 may compress the taken image data and then record the compressed taken image data on the recording medium 109. Further, when the compressed data is read from the recording medium 109, the compressed data is decoded and output to the display control unit 108.

Recording Media

The recording medium 109 is a memory card or the like to which a taken image data is written.

Power Unit

The power unit 113 includes a battery and a power circuit, and switches power ON/OFF in response to the power control signal which is output from the control unit 100. Further, the power unit 113 supplies power to each component of the digital camera 10.

Time Management Unit

The time management unit 114 is an example of an acquisition unit that acquires time information, more specifically, the time management unit 114 includes a clock circuit and manages time in a second, a minute, an hour, a month, and a year. The time information acquired by the time management unit 114 is added to the taken image data as a record of the imaging time.

Storage Unit

The storage unit 115 is a recording medium such as a Random Access Memory (RAM) and a Read Only Memory (ROM). The RAM is used as a work area of, for example, the control unit 100. Further, for example, a program by which the control unit 100 performs the power ON/OFF control, the imaging preparation operation control, the communication control, and the like, which are described above, is written onto the ROM.

GPS Positioning Unit

A Global Positioning System (GPS) positioning unit 116 receives radio signals from GPS satellites and measures a position (current position) in which the digital camera 10 is located. In addition, the GPS positioning unit 116 is an example of a position information acquisition unit that acquires current position information based on a signal acquired from outside, and the example of the position information acquisition unit is not limited to the GPS positioning unit 116. For example, the position information acquisition unit may be intended to acquire current position information by Wi-Fi, transmission and reception with other mobile phones, PHSs, and smart phones, near-field communication, or the like.

Gyro Sensor

The gyro sensor 117 has a function of detecting a varying speed of angular rotation (angular speed) around a Z-axis and an angular speed around a Y-axis when the digital camera 10 rotates. Further, the digital camera 10 may have a three-axis acceleration sensor having a function of detecting an acceleration along the X-axis, an acceleration along the Y-axis, and an acceleration along the Z-axis, as respective voltage values, as well as the gyro sensor 117.

NFC Communication Unit 120

The NFC communication unit 120 is an interface which performs non-contact communication with an adjacent external device (for example, the communication terminal 20) in cooperation with the NFC antenna 121 according to the control by the control unit 100. The NFC communication unit 120 transmits radio waves reaching a short distance of approximately 3 cm to 10 cm from the NFC antenna 121, or approximately 7 mm therefrom depending on a design, and performs NFC communication with the external device present within the radio wave reachable range.

For example, the NFC communication unit 120 transmits connection information for performing automatic connection of Wi-Fi (Wi-Fi Configuration) and an Android Application Record (AAR) from the external device in response to a Check Command. The Wi-Fi Configuration includes a Service Set Identifier (SSID) for Wi-Fi connection, a Pass-Key (encryption key), and the like.

Wi-Fi Communication Unit

The Wi-Fi communication unit 122 is an interface for performing wireless communication with a surrounding external device (for example, the communication terminal 20) in cooperation with a Wi-Fi antenna 123, according to the control by the control unit 100.

For example, the Wi-Fi communication unit 122 performs a Wi-Fi authentication in response to a Wi-Fi connection request from the external device, and performs a Wi-Fi communication connection establishment process with the external device.

Hitherto, a basic configuration of the digital camera 10 according to the present embodiment has been described in detail. Subsequently, the operation process between the digital camera 10 and the communication terminal 20 according to the present embodiment will be described with reference to FIG. 5 to FIG. 7.

3. Operation Process 3-1. Operation Process of Digital Camera

Figure 5:
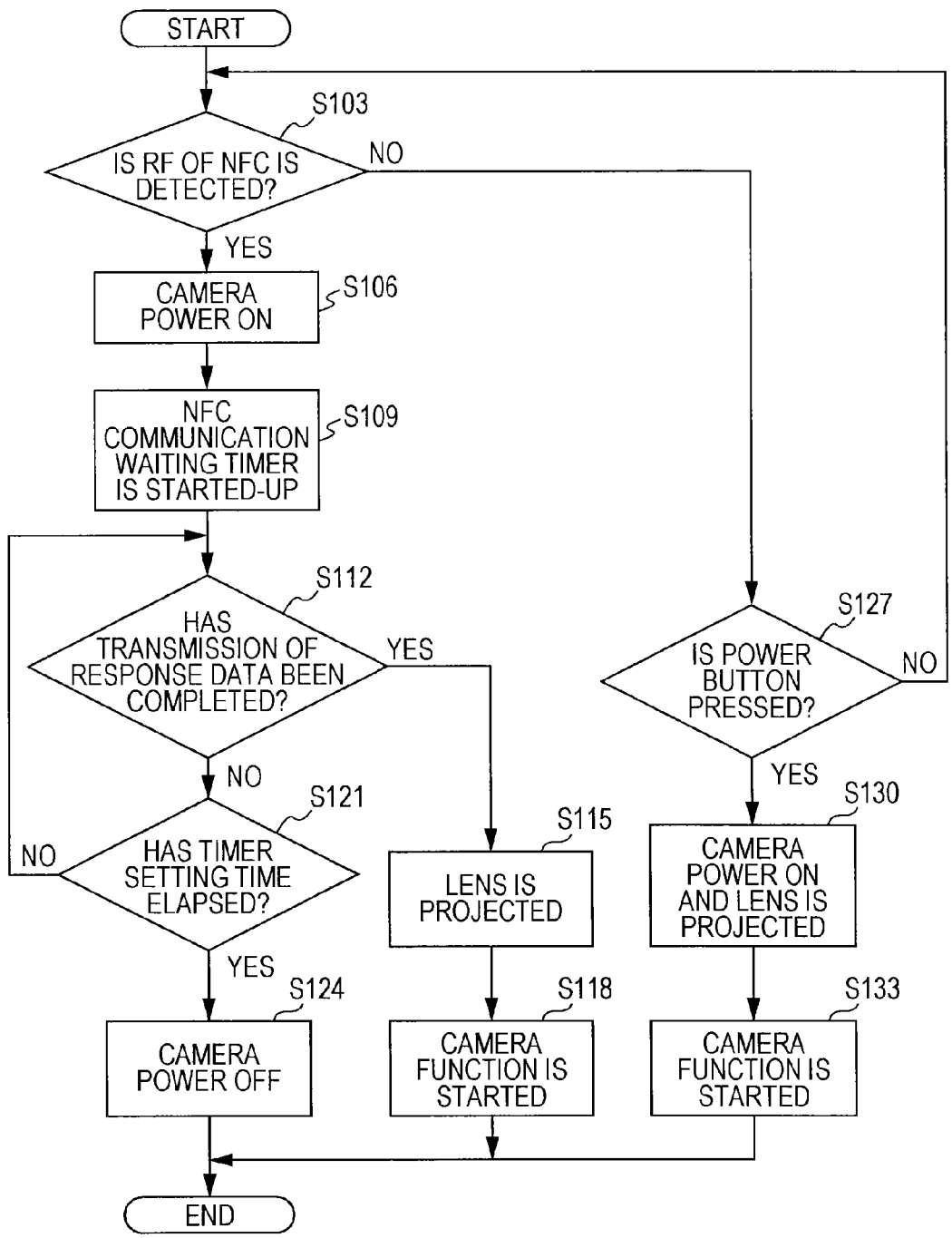
FIG. 5 is a flowchart showing an operation process according to the present embodiment.

First, the operation process of the digital camera 10 according to the present embodiment will be described with reference to FIG. 5. FIG. 5 is a flowchart showing an operation process of the digital camera 10 according to the present embodiment.

As shown in FIG. 5, first, in step S103, the NFC communication unit 120 detects a RF (wireless signal) of the NFC bandwidth from outside. Although such a wireless signal corresponds to a Polling Command transmitted from the communication terminal 20, the detection of the wireless signal is realized by a frequency detector of the wireless signal of the NFC bandwidth that the NFC communication unit 120 has, so that the decoding of the command is not performed at this time. The NFC communication unit 120 recognizes that it has detected the RF of the NFC bandwidth.

Next, when the wireless signal of the NFC bandwidth is detected (Yes in S103), in step S106, the control unit 100 outputs the power control signal to the power unit 113 such that the power of the digital camera 10 which has been in a power OFF state is turned ON. At this time, the control unit 100 does not perform the imaging preparation operation such as projecting the collapsible lens 13.

Next, in step S109, the control unit 100 starts a NFC communication waiting timer, using the time management unit 114.

Subsequently, in step S112, the control unit 100 determines whether the transmission of response data by the NFC communication in response to the Check Command from the outside is completed or not. The response data transmitted by the NFC communication in response to the Check Command is the afore-mentioned Wi-Fi Config and AAR.

Next, when the transmission of the response data is completed (Yes in S112), in step S115, the control unit 100 performs the imaging preparation operation such as projecting the collapsible lens 13.

Next, in step S118, the control unit 100 starts a camera function. For example, the control unit 100 displays a through image obtained by transforming an object image formed by an optical system including the collapsible lens 13 into an electric image data on the display unit 110. Further, the control unit 100 establishes Wi-Fi connection with the external device and performs an associated function with the external device.

On the other hand, when the transmission of the response data is not completed (No in S112) while a time (a predetermined time) which is set in the timer has elapsed (Yes in S121), in step S124, the control unit 100 outputs the power control signal to the power unit 113 such that the power of the digital camera 10 is turned OFF. Thus, even when the power is turned ON by malfunction in response to the radio waves of the same bandwidth as that of the Polling Command transmitted from wireless equipment that implements the associated function (automatic ticket-examination, vending machines, automatic authentication gates, or the like), other than the predetermined communication terminal 20, it is possible to turn OFF the power after a predetermined time. Further, it is possible to suppress unnecessary power consumption. Furthermore, even if the power is turned ON, the imaging preparation operation such as projecting the collapsible lens 13 is not performed, so that even if the power is turned ON in response to the radio waves from the wireless equipment other than the communication terminal 20, and thus it is possible to prevent the lens from being destroyed due to the collapsible lens 13 projecting within the case.

Figure 6:
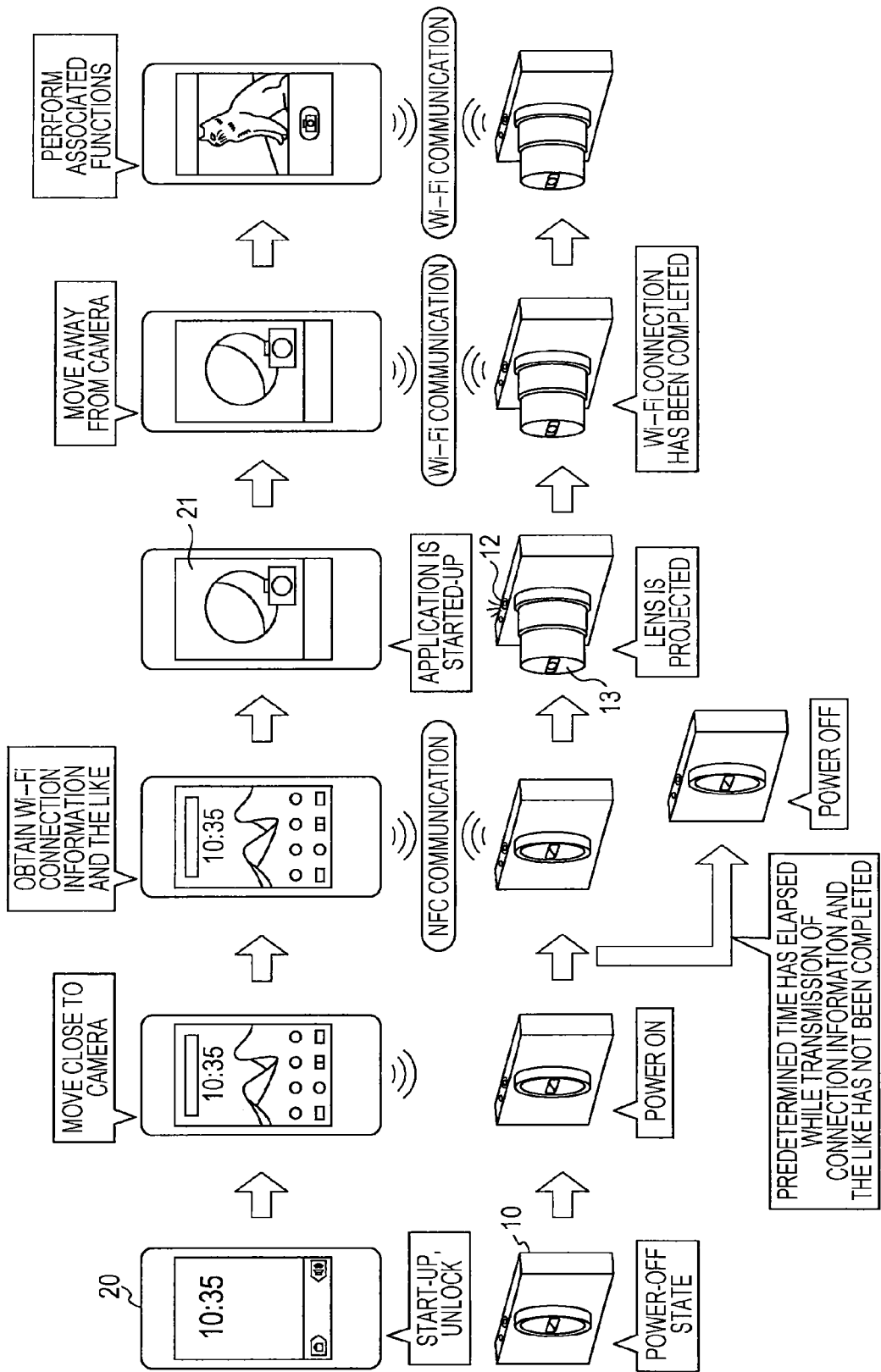
FIG. 6 is a state transition diagram describing a series of operations according to the present embodiment.

A state transition diagram describing the series of the operations of the digital camera 10 described above in association with the operations of the communication terminal 20 is shown in FIG. 6. As shown in FIG. 6, if the communication terminal 20 is moved close to the digital camera 10 in a power-OFF state, the power of the digital camera 10 is turned ON by NFC communication. However, at this time, the imaging preparation operation such as projecting the collapsible lens 13 is not performed. Thus, it is possible to prevent the user from understanding that the connection process at this time is successful and moving the communication terminal 20 away from the digital camera 10.

Next, as shown in FIG. 6, the communication terminal 20 receives Wi-Fi connection information or the like (the Wi-Fi Config and the AAR) from the digital camera 10 by NFC communication. If the transmission of the connection information or the like is completed, the digital camera 10 performs the imaging preparation operation such as projecting the collapsible lens 13, or turning on the power lamp 12. On the other hand, the communication terminal 20 starts a predetermined application according to AAR and performs a Wi-Fi connection request for the digital camera 10 using the Wi-Fi Config. Then, if the Wi-Fi connection between the communication terminal 20 and the digital camera 10 is completed, the associated function using the Wi-Fi communication is performed.

In this manner, since the digital camera 10 according to the present embodiment performs the projection of the collapsible lens 13 after the transmission of the connection information is completed, even if the digital camera 10 moves away from the communication terminal 20, the user understands at this time that the connection process is successful, and thus the communication terminal 20 can perform the series of operations until the execution of the associated function.

When the predetermined time has elapsed while the transmission of the connection information is not completed, as shown in FIG. 6, the digital camera 10 performs power-OFF control, so that it is possible to suppress unnecessary power consumption when the digital camera 10 is already started by malfunction. Further, even if the power is turned ON by malfunction, the collapsible lens 13 does not project. Thus, it is possible to prevent the lens from being damaged by the projection of the collapsible lens 13 in a state of being housed in a case when the power of the digital camera 10 is turned ON.

Hitherto, the power-ON control by the NFC communication has been described. In addition, as shown in FIG. 5, when the Polling Command is not detected (No in S103), and the press of the power button 15 is detected (Yes in S127), in step S130, the control unit 100 turns ON the power as usual, and performs the imaging preparation operation such as projecting the collapsible lens 13.

Subsequently, in step S133, the control unit 100 starts a camera function.

3-2. Operation Process of Control System

Figure 7:
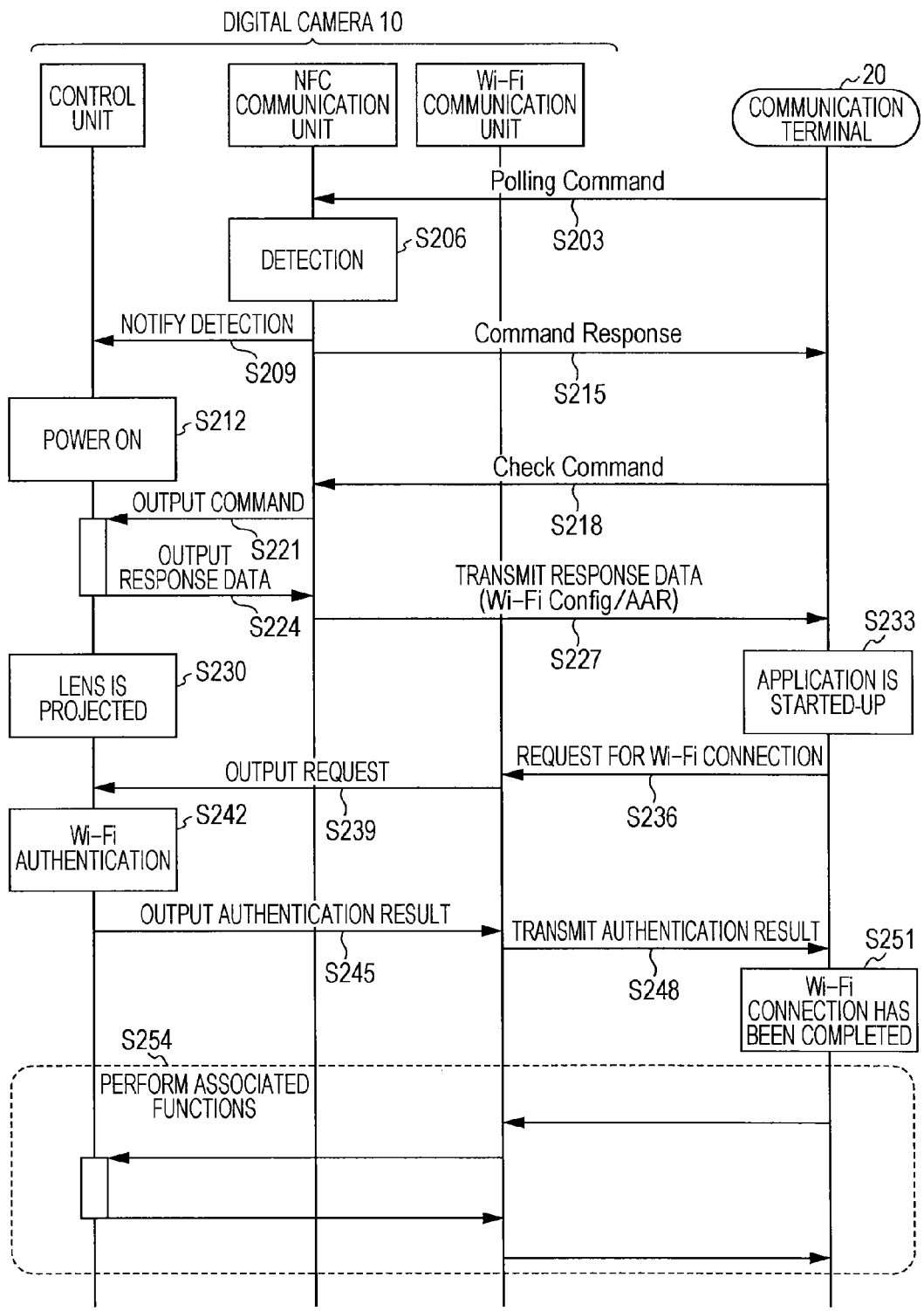
FIG. 7 is a sequence diagram showing an operation process of a control system according to the present embodiment.

Subsequently, the operation process of a control system including the digital camera 10 and the communication terminal 20 according to the present embodiment will be described with reference to FIG. 7. FIG. 7 is a sequence diagram showing an operation process of the control system according to the present embodiment.

As shown in FIG. 7, first, in step S203, the communication terminal 20 transmits a Polling Command by NFC communication.

Next, in step S206, if the NFC antenna 121 of the digital camera 10 is present within a predetermined radio wave reachable range (for example, approximately 7 mm) from the NFC antenna of the communication terminal 20, the NFC communication unit 120 detects the Polling Command.

In addition, as described above, since the NFC communication unit 120 detects the command by the frequency detector of the wireless signal of the NFC bandwidth, it is not recognized which command the detected wireless signal is, and it is recognized that the RF of the NFC bandwidth is detected.

Next, in step S209, the NFC communication unit 120 is driven in response to the detection of the RF of the NFC bandwidth and performs a detection notification to the control unit 100.

Next, in step S212, the control unit 100 outputs the power control signal to the power unit 113 in response to the detection notification by the NFC communication unit 120 and performs the power-ON control.

Next, in step S215, the NFC communication unit 120 transmits Command Response by the NFC communication in response to the detection of the RF of the NFC bandwidth.

Subsequently, in step S218, since the communication terminal 20 detects the Command Response from the digital camera 10, the communication terminal 20 finds a NFC communication counterpart and transmits a Check Command in order to acquire a predetermined piece of information.

Next, the NFC communication unit 120 of the digital camera 10 outputs the Check Command to the control unit 100 by NFC communication in step S221.

Next, the control unit 100 outputs response data to the NFC communication unit 120 in response to the Check Command in step S224. Here, the response data includes the Wi-Fi Config and the AAR.

Next, in step S227, the NFC communication unit 120 transmits the response data to the communication terminal 20 by NFC communication.

In addition, the process of S218 to S227 may be repeated a plurality of times, and response data may be divided and transmitted a plurality of times.

Subsequently, in step S233, the communication terminal 20 starts a predetermined application in response to the received AAR.

Next, in step S236, the communication terminal 20 requests Wi-Fi connection to the digital camera 10, using the received Wi-Fi Config.

Next, in step S239, the Wi-Fi communication unit 122 of the digital camera outputs the connection request received from the communication terminal 20 to the control unit 100.

Next, in step S242, the control unit 100 performs Wi-Fi authentication. In addition, the Wi-Fi authentication may be performed in the Wi-Fi communication unit 122.

Next, in step S245, the control unit 100 outputs the authentication result to the Wi-Fi communication unit 122.

Subsequently, in step S248, the Wi-Fi communication unit 122 transmits the authentication result to the communication terminal 20.

Then, in step S251, if the authentication is successful, the Wi-Fi connection is completed.

Thereafter, in step S254, the associated function using the Wi-Fi communication is performed between the communication terminal 20 and the digital camera 10.

4. Other Embodiments

Although the above embodiment has exemplified the digital camera 10 which is used separately from the communication terminal 20, an example of an imaging unit 1 including a digital camera capable of being used while being mounted on the communication terminal 20 will be described as another embodiment.

Note, in the following description, it is assumed that a longitudinal direction, a vertical direction and a horizontal direction are indicated as directions viewed from the photographer when an image data is taken. Accordingly, an object side is a front side and a photographer side is a rear side.

The longitudinal, the vertical direction and the horizontal direction in the following description are for illustrative purpose only, and the implementation of the present technology is not limited to these directions.

Figure 8:
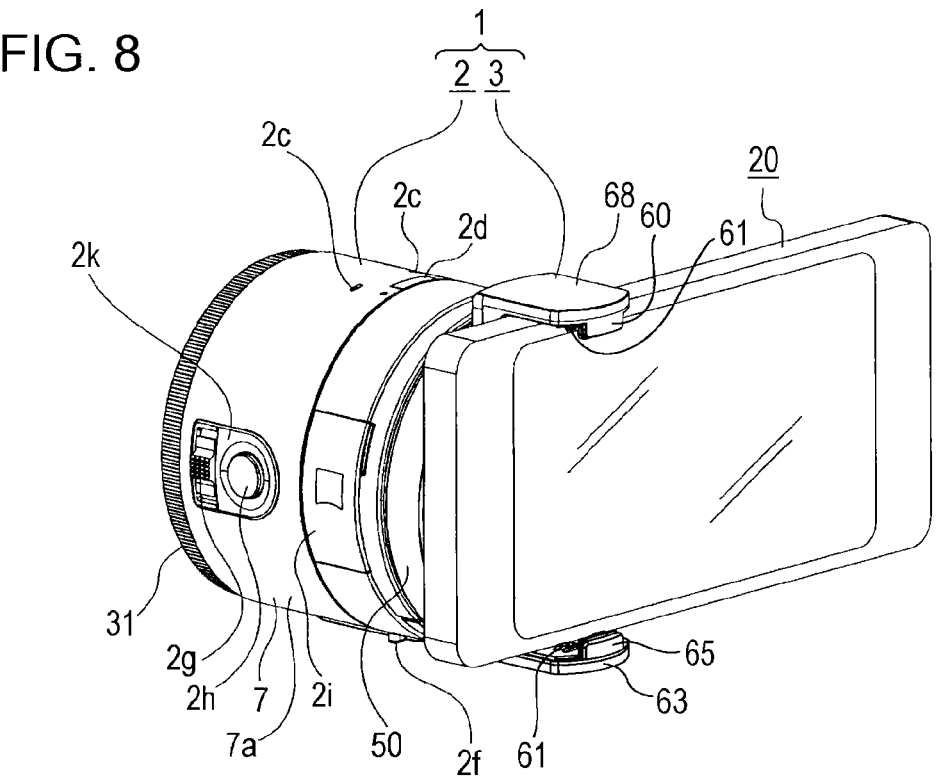
FIG. 8 is a perspective view showing a state in which an imaging unit as an example of a digital camera of another embodiment is mounted on a communication terminal.
Figure 9:
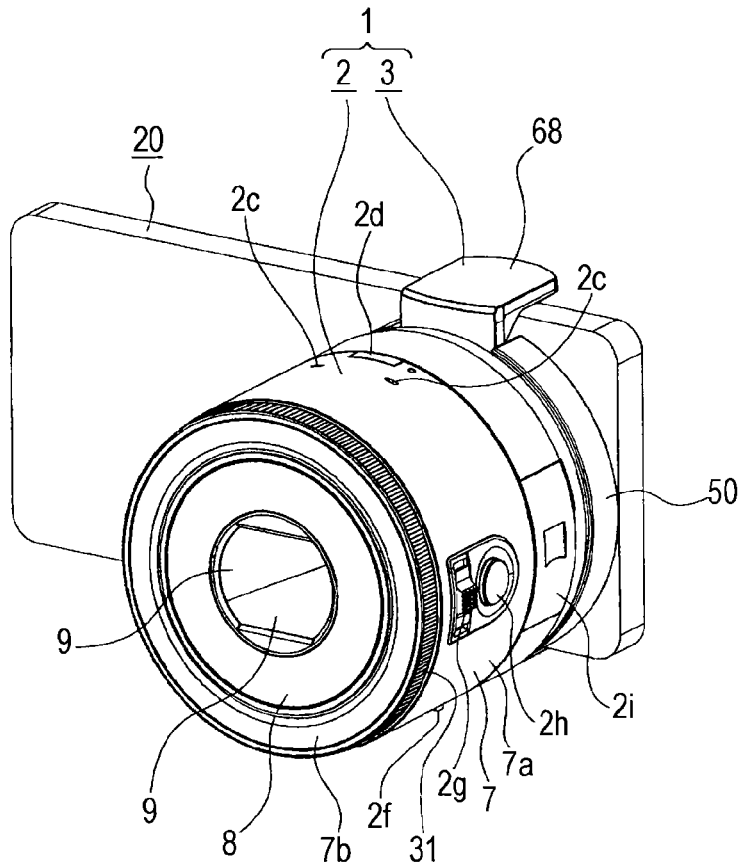
FIG. 9 is a perspective view showing a state in which the imaging unit of another embodiment is mounted on the communication terminal.
Figure 10:
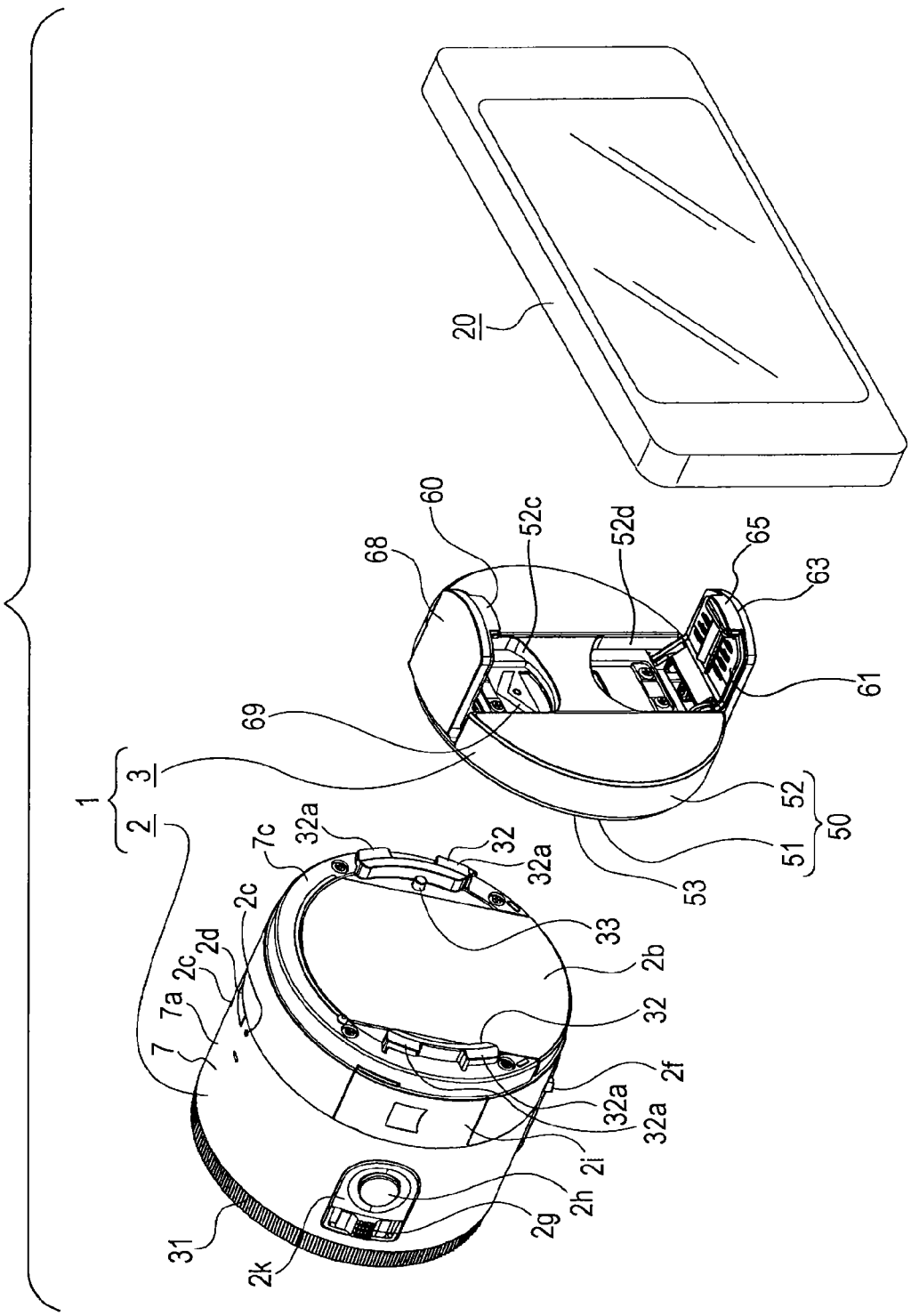
FIG. 10 is a perspective view of an imaging device, adapter and a communication terminal of another embodiment.
Figure 11:
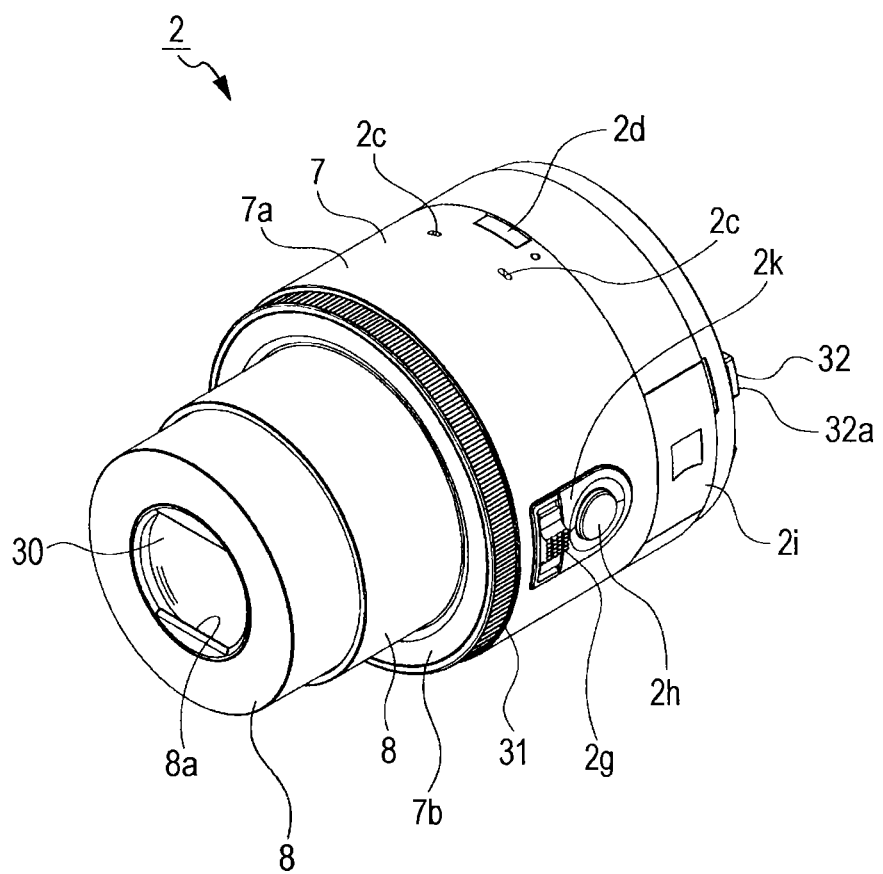
FIG. 11 is a perspective view showing a state in which an inner barrel part of the imaging device of another embodiment projects.
Figure 16:
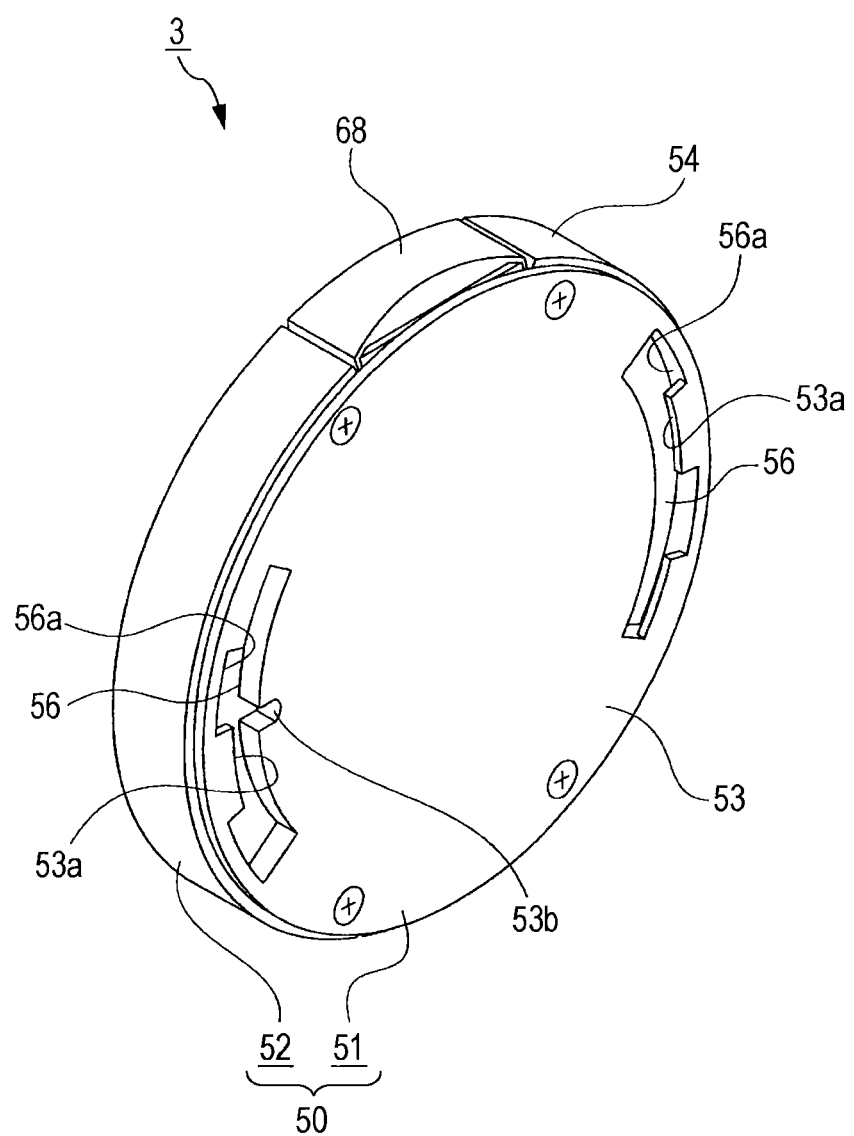
FIG. 16 is a perspective view of the adapter of another embodiment.
Figure 17:
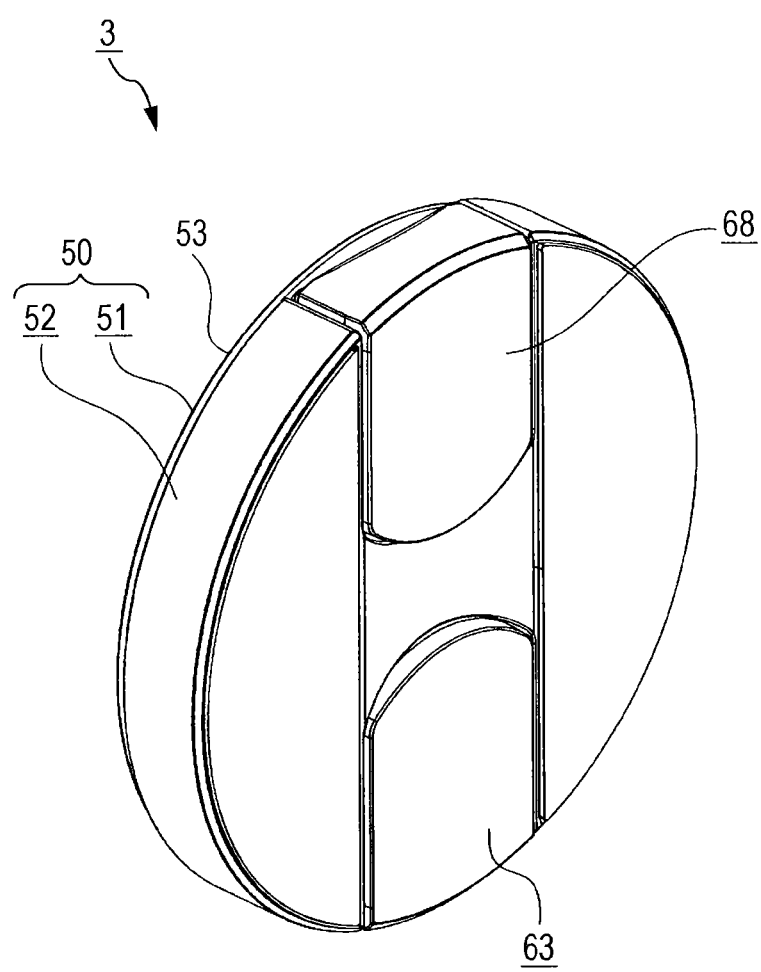
FIG. 17 is a perspective view of the adapter of another embodiment.

FIGS. 8 and 9 show a state in which the imaging unit 1 is mounted on the communication terminal 20, and FIG. 10 is a perspective view of the imaging unit 1 configured with a digital camera 2 and an adapter 3, and the communication terminal 20. Further, FIG. 11 is a perspective view showing a start-up state of the digital camera 2. FIGS. 12 to 15 are respectively a plan view, a bottom view, a left side view and a right side view of the digital camera 2. FIGS. 16 and 17 are perspective views of the adapter 3. Hereinafter, the imaging unit 1 will be described with reference to these drawings.

The imaging unit 1 is configured with the digital camera 2 and the adapter 3 (see FIGS. 8 to 10). The adapter 3 is detachable to the rear surface of the digital camera 2. However, the imaging unit 1 may be formed in an integral structure in which the adapter 3 is integrally formed in the rear end part of the digital camera 2. The digital camera 2 has a communication function capable of transmitting and receiving image data and the like with the communication terminal 20.

The adapter 3 is detachable to the communication terminal 20.

The digital camera 2 has an outer barrel part 7, a plurality of lens groups disposed inside the outer barrel part 7, and an imaging element, not shown, located behind the lens group (see FIGS. 8 to 11). In the digital camera 2, light received through the lens group is photo-electrically converted by the imaging element. Accordingly, the digital camera 2 is capable of taking an image data and video data.

The outer barrel part 7 has a circumferential surface part 7a formed in a substantially cylindrical shape penetrating to the front and rear, a flaring part 7b flaring inward from a front end part of the circumferential surface part 7a, and a rear surface part 7c which closes and opens the circumferential surface part 7a from the rear side.

Inner barrel parts 8 and 8 which are movable in the longitudinal direction are supported inside the outer barrel part 7. Accordingly, the digital camera 2 is in an image data taking state due to the inner barrel parts 8 and 8 extending forward relative to the outer barrel part 7 (see FIG. 11), and is in a collapsed state (see FIG. 9) due to the inner barrel parts 8 and 8 which have been extended forward being retracted rearward and being housed inside the outer barrel part 7.

A light transmission hole 8a of a substantially rectangular shape is formed in a front surface part of the inner barrel part 8 on the innermost side (see FIG. 11). Lens barriers 9 and 9 are supported openably on the rear side of the front surface part of the inner barrel part 8 on the innermost side. The lens barriers 9 and 9 are closed in the collapsed state and opened in the image data taking state by an opening and closing mechanism, not shown. Accordingly, the light transmission hole 8a of the inner barrel part 8 is closed by the lens barriers 9 and 9 in the collapsed state (see FIG. 9), and is opened by the lens barriers 9 and 9 in the image data taking state (see FIG. 11).

A plurality of lens groups including an imaging lens 30 (see FIG. 11) located furthest forward are disposed while being spaced along an optical axis inside the digital camera 2. If the light transmission hole 8a is opened by the lens barriers 9 and 9, light is incident from the outside to the imaging lens 30.

An operation ring 31 is supported rotatably at the front edge part of the outer barrel part 7 (see FIG. 9). A manual focus operation and a zoom operation are performed by the operation ring 31 being operated, and thus the lens group is moved in the optical axis direction.

Since the operation ring 31 is provided circumferentially at the front edge part of the outer barrel part 7, the user can easily perform a rotation operation of the operation ring 31. Since a surface of the operation ring 31 has a shape of a saw-like grip part, this is also suitable for improving the operability of the rotation operation.

In addition, the operation ring 31 can switch an operation mode between a manual focus operation and a zoom operation, in response to a user operation from the communication terminal 20, by the control by the wireless communication. Thus, the operation ring 31 can be used appropriately as operators for the focus operation and the zoom operation, depending on the circumstances and preferences of the user.

Coupling parts 32 and 32 protruding rearward are provided at positions opposed to each other at 180° in an outer circumferential surface part of the rear surface part 7c of the outer barrel part 7 (see FIGS. 10 and 12 to 15). Engaging protrusions 32a and 32a protruding outward while being spaced circumferentially are provided in the coupling part 32. Thus, an engaging structure in which coupling recesses 56a and 56a of the adapter 3 to be described later are engaged with engaging pieces 53a and 53a is formed.

A lock pin 33 is movably supported in the longitudinal direction in the vicinity of the coupling part 32 of the rear surface part 7c, and the lock pin 33 is biased rearward by a spring, not shown.

Figure 15:
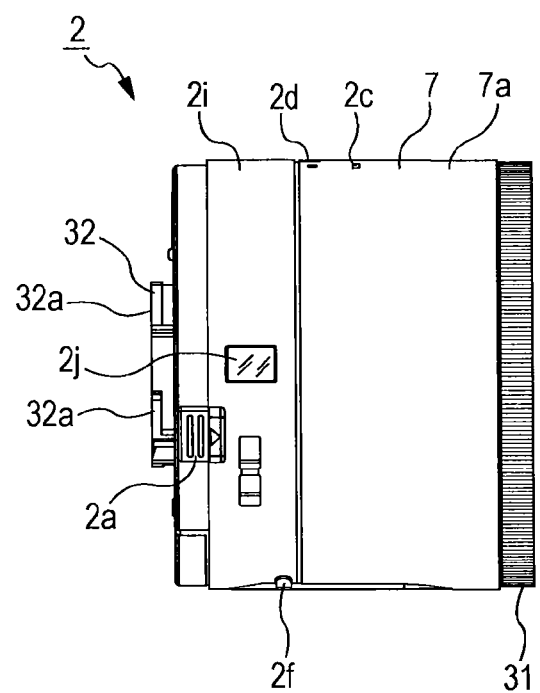
FIG. 15 is a right side view of the imaging device.

A lock release lever 2a is disposed at the rear end part of the circumferential surface part 7a of the outer barrel part 7 (see FIG. 15). By the lock release lever 2a being operated, the lock pin 33 is pulled into the inside of the outer barrel part 7.

A battery cover 2b is disposed at a part between the coupling parts 32 and 32 of the rear surface part 7c of the outer barrel part 7 (see FIG. 10). A battery accommodating part that accommodates a battery in the inside of the battery cover 2b is formed in the digital camera 2, and a battery, not shown, can be mounted in or removed from the accommodating part by opening and closing the battery cover 2b.

Since the coupling parts 32 and 32 are formed in the outer circumferential surface part of the rear surface part 7c, the part between the coupling parts 32 and 32 can be used to dispose the battery cover 2b and the battery accommodating part. In other words, since the coupling parts 32 and 32 are formed in the outer circumferential surface part of the rear surface part 7c, the battery accommodating space is ensured without disturbance.

Figure 12:
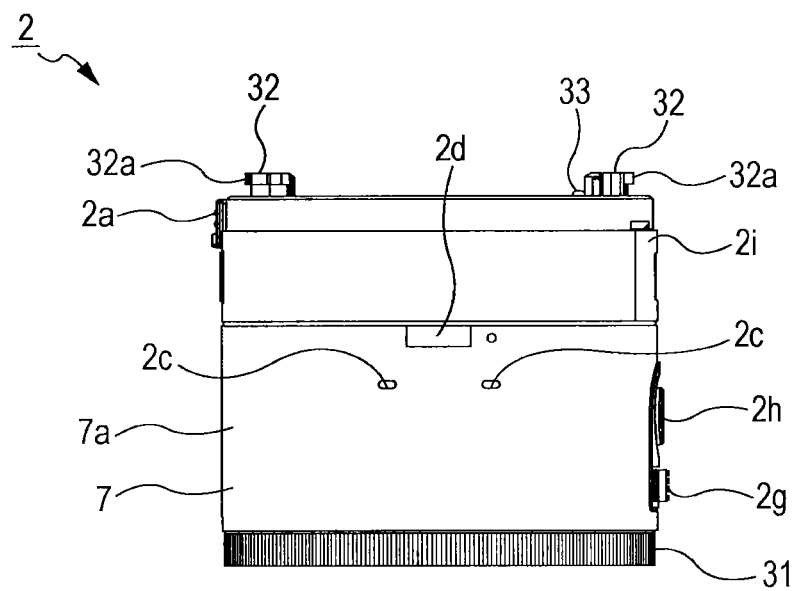
FIG. 12 is a plan view of the imaging device.

Microphones 2c and 2c and a power button 2d are disposed while being spaced longitudinally at an upper end part of the circumferential surface part 7a of the outer barrel part 7 (see FIGS. 9, 10 and 12). The microphones 2c and 2c are intended to receive external sound. In an apparatus in which the outer barrel part 7 as a lens housing is a main body as in the present embodiment, the external sound is most unlikely to be cut off at the circumferential surface part 7a of the outer barrel part 7 among positions in which the microphones are easily disposed. Therefore, since the microphones 2c and 2c are disposed at the circumferential surface part 7a, this is suitable for collecting external sound. Further, since the microphones 2c and 2c are provided at the upper end part of the circumferential surface part 7a, when the user holds the outer barrel part 7, the microphones 2c and 2c are unlikely to be covered, and thus this is suitable for receiving external sound.

Note that the parts of the shown microphones 2c and 2c are viewed as microphone holes from the outside. Although the microphone 2c and 2c themselves are disposed at the inside of the circumferential surface part 7a, the microphone holes (2c and 2c) which guide external sound to the two microphones receiving at least the external sound are formed at horizontally symmetrical positions on the circumferential surface part 7a. The horizontally symmetrical positions are suitable for collecting left and right stereo audio.

The power button 2d is disposed such that the surface thereof does not protrude further than a surface for forming the circumferential surface part 7a. For example, as shown, the power button 2d is formed in the same surface as the circumferential surface part 7a. Alternatively, the surface of the power button 2d may be in a state of being lower than the circumferential surface part 7a.

Since the power button 2d does not protrude from the circumferential surface part 7a, this is suitable for preventing the power button 2d from being mistakenly operated.

By the power button 2d being operated, power is supplied or blocked with respect to the digital camera 2. When the power is supplied, the inner barrel parts 8 and 8 extend forward with respect to the outer barrel part 7 so as to set an image data taking state. When the power is cut off; the inner barrel parts 8 and 8 which have extended forward are collapsed rearward and housed in the inside of the outer barrel part 7 so as to set a collapsed state.

Figure 13:
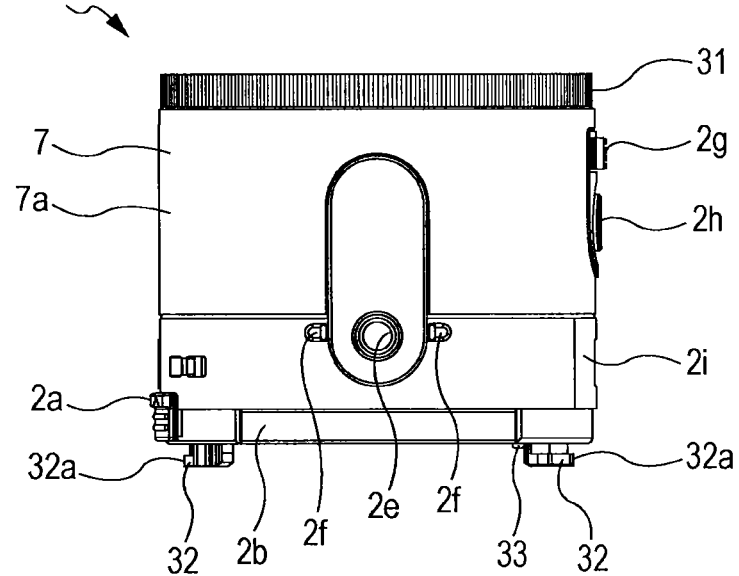
FIG. 13 is a bottom view of the imaging device.

A tripod hole 2e is formed in a lower end part of the circumferential surface part 7a of the outer barrel part 7 (see FIG. 13). The tripod hole 2e is a hole for coupling the digital camera 2 with a tripod, not shown, when taking an image data. In the case of the shape in which the outer barrel part 7 forms a main body of the digital camera 2 as in the present embodiment, since the tripod hole 2e is formed in the lower end part of the circumferential surface part 7a, it is possible to improve a balance when mounting the tripod.

Protrusions for preventing rolling 2f and 2f are provided on the left and right sides of the tripod hole 2e in the lower end part of the circumferential surface part 7a of the outer barrel part 7 (see FIGS. 10 and 13). The protrusions for preventing rolling 2f and 2f protrude slightly downward. The digital camera 2 is prevented from being rolled by the protrusions for preventing rolling 2f and 2f when the digital camera 2 is placed on a desk, a table, or the like, so that it is possible to prevent the digital camera 2 from being damaged or breaking down due to falling or the like.

In the case where the entire circumferential surface part 7a is a curved surface as the present embodiment or at least a part thereof is a curved surface and such a circumferential surface part 7a forms an outer housing, the protrusion for preventing rolling 2f is useful.

Figure 14:
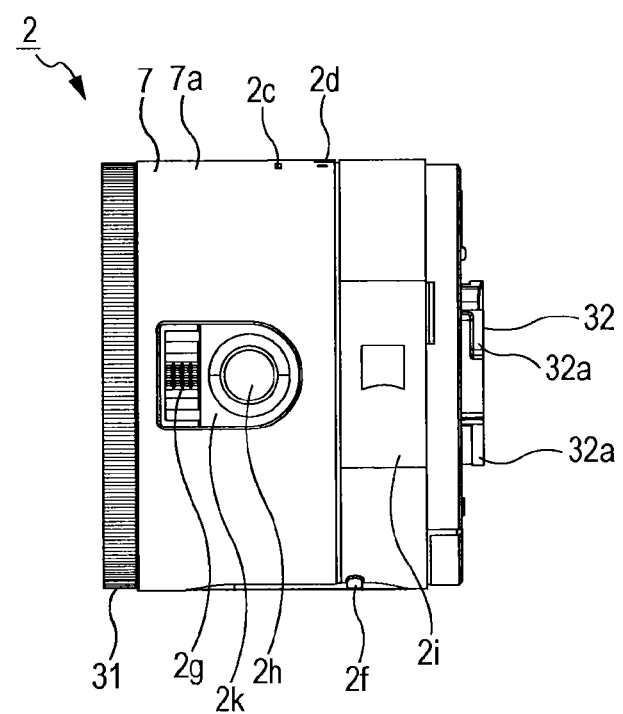
FIG. 14 is a left side view of the imaging device.

A zoom switch 2g and a shutter button (image taking button) 2h are adjacently disposed while being arranged forward and backward in a left end part of the circumferential surface part 7a of the outer barrel part 7 (see FIGS. 10 and 14). Zooming is performed between the telephoto and the wide angle by the zoom switch 2g being operated, and an object is taken by the shutter button 2h being operated. Since the zoom switch 2g and the shutter button 2h are adjacently disposed, it is assumed that it is easy for the user to perform a series of image taking operations, that is, an adjustment of a view angle by zooming and a shutter operation. In addition, the zoom switch 2g and the shutter button 2h may be adjacently disposed in a state of being arranged in a vertical direction or a diagonal direction, as well as being arranged forward and backward.

The shutter button 2h and the zoom switch 2g are disposed at the same member 2k. The member 2k forms a part of the outer barrel part 7 and the circumferential surface part 7a. A structure in which the zoom switch 2g and the shutter button 2h which are adjacently disposed are attached to the member 2k and the member 2k is attached to the outer barrel part 7 can increase the efficiency in the manufacturing assembly of the imaging device.

In addition, the shutter button 2h may be an operator, for example, by which autofocus is performed by being pressed halfway, and an image taking operation of an object is performed by being pressed entirely. Assuming a case where, for example, the digital camera 2 is used alone, since there is no display unit (that is, the communication terminal 20), the focus operation is difficult. Assuming that auto focus is performed by pressing the shutter button 2h halfway, it is possible to provide an operation intuitive for the user. Further, if a sound output unit is provided to output electronic sound or the like at the time of an auto focus operation, this is also suitable for operation recognition of the user.

Further, the zoom switch 2g is formed in a zoom lever type as shown. Since the zoom operation is performed by a lever operation, improved operability is achieved. Further, the zoom switch 2g may be a push button type by using a wide button/telephoto button. Furthermore, two zoom switches of a button type or a lever type may be provided.

Since the zoom switch 2g and the shutter button 2h are disposed at the left end part of the circumferential surface part 7a, the operating finger is naturally located near the zoom switch 2g and the shutter button 2h when the digital camera 2 is gripped from below and operated when taking an image, so that it is possible to improve the usability of the digital camera 2 due to improvement in operability.

Further, since the zoom switch 2g and the shutter button 2h are disposed at the left end part of the circumferential surface part 7a, they are located apart from the microphones 2c and 2c provided at the upper end part of the circumferential surface part 7a. This enables the microphones 2c and 2c not to pick up sound when the user operates the shutter button 2h or the zoom switch 2g.

Further, the zoom switch 2g and the afore-mentioned operation ring 31 are prepared for the zoom operation. Thus, the user can select a zoom operation method depending on the circumstances and preferences, and thus the operability is improved.

Further, since the shutter button 2h and the power button 2d are disposed while being spaced laterally at the upper side of the circumferential surface part 7a, as different positions in the circumferential direction on the circumferential surface part 7a, it is easy to prevent operation errors in power operations and image taking operations. Further, although the shutter button 2h and the power button 2d may be disposed while being spaced apart on the right side and the left side of the circumferential surface part 7a, in view of the upper side of the circumferential surface part 7a being suitable for the position of the power button 2d as described above, it is appropriate that the shutter button 2h be located in the sides (left side or right side) of the circumferential surface part.

A cover body 2i is disposed on the rear side of the shutter button 2h in the left end part of the circumferential surface part 7a of the outer barrel part 7. In the digital camera 2, external connection terminals such as a Universal Serial Bus (USB), a memory card slot, or the like, not shown, are provided inside the cover body 2i. Accordingly, it is possible to connect external devices and to mount the memory card by opening the cover body 2i. Further, it is possible to record an image data or a video data taken by the digital camera 2 onto the external device or the memory card by connecting the external device and mounting the memory card.

A display unit 2j made of a liquid crystal panel or the like is disposed at the right end part of the circumferential surface part 7a of the outer barrel part 7 (see FIG. 15). An amount of remaining charge of a battery, whether the memory card is inserted into the memory card slot or not, and the like are displayed on the display unit 2j. The display unit 2j is not intended to be used to display the taken image.

Since the display unit 2j is disposed, the amount of remaining charge of the battery, whether the memory card is inserted into the memory card slot or not, and the like can be confirmed from the outside of the digital camera 2, and it is possible to improve the usability of the digital camera 2.

A wireless communication function is provided in the digital camera 2. By using the wireless communication, for example, it is possible to perform various types of operations such as display or storage of an image data or video data taken by the digital camera 2 on the communication terminal 20, execution of an imaging function of the digital camera 2 by operating the communication terminal 20, and execution of a zoom function of the digital camera 2 by operating the communication terminal 20.

For example, specifically, the NFC communication unit (NFC tag) is installed in the inside close to the upper end part of the circumferential surface part 7a, inside the outer barrel part 7, and performs non-contact communication with the NFC communication unit installed in the communication terminal 20. Further, for communication or the like of the taken image data, for example, a Wi-Fi communication unit is provided and performs wireless communication with a Wi-Fi communication unit installed in the communication terminal 20.

The power of the digital camera 2 may be turned ON by NFC communication from the communication terminal 20 side, in addition to the power being turned ON by operating the power button 2d as described above. For example, if NFC communication is established, the power of the digital camera 2 is turned ON. Then, for example, since the NFC communication function is displayed near the power button 2d, such as the upper end part of the circumferential surface part 7a, the user easily ascertains a power-ON operation.

Further, since the NFC communication unit is disposed on the upper side inside the outer barrel part 7, when the tripod is used by being attached to the tripod hole 2e described above, it is easy to move the NFC communication unit as close as possible to the communication terminal 20 and thus this is advantageous for non-contact communication.

In view of a state of being placed on a mounting surface such as a desk, the user usually moves the communication terminal 20 close to the digital camera 2 from above. Accordingly, disposing the NFC communication unit on the upper side inside the outer barrel part 7 is suitable for a short-distance wireless communication even in such a use mode.

In addition, although another example is considered in which the arrangement position of the NFC communication unit within the digital camera 2 is set to positions other than the upper side inside the outer barrel part 7, it is not preferable that the NFC communication unit be disposed on at least a rear side of the outer barrel part 7, that is, a position close to the rear surface part 7c. If the NFC communication unit that performs short-distance wireless communication is disposed on the rear side, when the digital camera 2 is attached to the communication terminal 20 by the adapter 3 as shown in FIGS. 8 and 9, the digital camera 2 is in a state of being usually close to the NFC communication unit of the communication terminal 20 and thus there are some cases where the digital camera 2 usually performs polling. Therefore, it is preferable that the NFC communication unit be disposed at positions other than the rear side of the outer barrel part 7.

The adapter 3 is configured such that respective necessary parts are arranged in an inner part and an outer part of the housing 50 (see FIGS. 16 and 17).

The housing 50 is made by combining a base body 51 located on the front side of the housing 50 and a cover body 52 located on the rear side thereof.

The base body 51 has a disc-like base surface part 53 and protrusions 56 and 56 projecting rearward from the base surface part 53 (see FIG. 16).

The protrusions 56 and 56 protrude from the positions opposed to each other at 180° in the outer circumferential surface part of the base surface part 53, and are formed in a shape extending in a circumferential direction in both left and right end parts of the base surface part 53. The protrusion 56 is opened forward, and the inner space of the protrusion 56 is formed as coupling recesses 56a (see FIG. 16).

Engaging pieces 53a, 53a, and . . . that cover a part of the coupling recesses 56a from the front side are provided in the outer circumferential surface part of the base surface part 53. A lock hole 53b communicating with the coupling recess 56a is formed in the base surface part 53.

The contour of a cover body 52 is a circular shape with some exceptions.

An accommodating recess 52c which is opened rearward and upward and an accommodating recess 52d which is opened rearward and downward are formed in the cover body 52 (see FIG. 10).

A first attaching body 68 and a second attaching body 63 for being mounted on the communication terminal 20 are provided in the adapter 3.

The first attaching body 68 can take an accommodating position in which the first attaching body 68 is accommodated in the accommodating recess 52c and closed with respect to the base body 51 (see FIG. 17). Further, the first attaching body 68 can take a holding position to be opened with respect to the base body 51 (see FIG. 10). The first attaching body 68 is pivoted between the accommodating position and the holding position.

The first attaching body 68 is in a state which protrudes rearward from the cover body 52 in the holding position.

The second attaching body 63 is pivoted between an accommodating position in which the second attaching body 63 is accommodated in the accommodating recess 52d and closed with respect to the base body 51 (see FIG. 17) and a holding position to be opened with respect to the base body 51 (see FIG. 10). The second attaching body 63 is in a state which protrudes rearward from the cover body 52 in the holding position. In other words, the second attaching body 63 is in a state to be accommodated in the base body 51 as the same accommodating position as that of the first attaching body 68, and is in a state of protruding rearward from the cover body 52 as the holding position.

The adapter 3 is coupled to the digital camera 2 as follows.

First, the coupling parts 32 and 32 of the digital camera 2 are respectively inserted into the coupling recesses 56a and 56a formed in the base body 15 of the adapter 3.

Next, the adapter 3 is rotated relative to the digital camera 2. If the adapter 3 is rotated, the engaging pieces 53a and 53a of the adapter 3 and the engaging protrusions 32a and 32a of the digital camera 2 are respectively engaged, and the movement in the longitudinal direction of the adapter 3 with respect to the digital camera 2 is restricted. In other words, a state is formed in which the engaging pieces 53a and 53a of the adapter 3 are engaged with the engaging protrusions 32a and 32a.

At the same time, the lock pin 33 of the digital camera 2 is pressed by the base body 51 and pulled into the inside of the outer barrel part 7 against the biasing force of a spring, the adapter 3 is rotated to a predetermined position, and the lock pin 33 protrudes from the outer barrel part 7 due to a spring and is inserted into the locking hole 53b in a position where the locking hole 53b is matched to the lock pin 33.

The rotation of the adapter 3 with respect to the digital camera 2 is restricted by the lock pin 33 being inserted into the locking hole 53b, and the adapter 3 is coupled to the digital camera 2 in a locked state.

Since the digital camera 2 and the adapter 3 are rotated relatively through the coupling parts 32 and 32 described above, the digital camera 2 can be easily coupled to the adapter 3. Further, the coupled state is maintained by the lock pin 33.

The release of the coupling of the adapter 3 to the digital camera 2 is performed by the adapter 3 being rotated with respect to the digital camera 2 in the opposite direction to that at the coupling time, in a state in which the lock pin 33 is pulled into the inside of the outer barrel part 7 and locking is released by the lock release lever 2a being operated. If the adapter 3 is rotated with respect to the digital camera 2 in the opposite direction to that at the coupling time, the engaging state of the engaging pieces 53a and 53a and the engaging protrusions 32a and 32a of the digital camera 2 is released. In this state, the adapter 3 is moved rearward with respect to the digital camera 2 so as to pull out the coupling parts 32 and 32 from the coupling recesses 56a and 56a so that the coupling of the adapter 3 to the digital camera 2 is released.

The attachment of the adapter 3 to the communication terminal 20 is performed as follows.

First, the first attaching body 68 and the second attaching body 63 are respectively pulled out from the accommodating recesses 52c and 52d of the cover body 52 and rotated to the holding position.

Then, the first attaching body 68 is gripped and moved upward. The first attaching body 68 is attached to a slider, not shown, inside the adapter 3 and is movable upward. Further, a spring is attached to the slider, and the first attaching body 68 is usually pressed in a direction approaching the second attaching body 63.

If the first attaching body 68 is moved to be pulled upward, the distance between the first attaching body 68 and the second attaching body 63 is gradually increased. The first attaching body 68 is moved upward to a position corresponding to the size of the communication terminal 20 to which it is attached.

The communication terminal 20 is interposed between the first attaching body 68 and the second attaching body 63, and the adapter 3 is attached to the communication terminal 20 (see FIGS. 8 and 9). At this time, the first attaching body 68 is biased in the direction approaching the second attaching body 63, and thus elastic bodies 61 (see FIGS. 8 and 10) respectively provided in the first attaching body 68 and the second attaching body 63 of the communication terminal 20 are in close contact with each other.

Further, in a state where the adapter 3 is attached to the communication terminal 20, the holding protrusion 60 of the first attaching body 68 and the holding protrusion 65 of the second attaching body 63 are in a state of wrapping around the rear side of the communication terminal 20. Accordingly, the adapter 3 is prevented from separating forward from the communication terminal 20.

For the above operations, the adapter 3 is configured such that the second attaching body 63 is fixed and the first attaching body 68 is expanded and contracted. The distance between the first attaching body 68 and the second attaching body 63 is adjusted by only the first attaching body 68 which is an upper side being expanded and contracted, so that an imaging optical axis of the digital camera 2 is located in a position below a center point in a height direction (the short side direction of the casing of the communication terminal 20) of a display panel of the communication terminal 20. Then, regardless of the size of the communication terminal 20, the bottom position of the digital camera 2 and the bottom position of the communication terminal 20 is substantially the same.

Therefore, regardless of the size of the communication terminal 20, the communication terminal 20 with the imaging unit 1 attached is in a state in which the user easily and stably holds it. Further, even when the communication terminal 20 with the imaging unit 1 attached is placed on a desk or the like as it is, the attitude thereof is stable and thus the communication terminal 20 with the imaging unit 1 attached is suitable for imaging as it is placed.

Since the second attaching body 63 is fixed, there is also an advantage that the attached state of the adapter 3 to the communication terminal 20 is stable.

In addition, a mark presenting that the first attaching body 68 is configured to be expanded upward as shown in FIG. 10 is provided in the adapter 3. The user can recognize the position of the first attaching body 68 to be expanded upward by the mark, and the user can easily understand an attaching method when attaching to the communication terminal 20, so that the usability can be improved.

If the first attaching body 68 is gripped and moved upward, the communication terminal 20 is pulled out from between the first attaching body 68 and the second attaching body 63 so as to remove the adapter 3 from the communication terminal 20. Thereafter, if the upward force which is applied to the first attaching body 68 is removed, the first attaching body 68 is moved downward by the biasing force and returns to a state of that before it is attached to the communication terminal 20.

Figure 18:
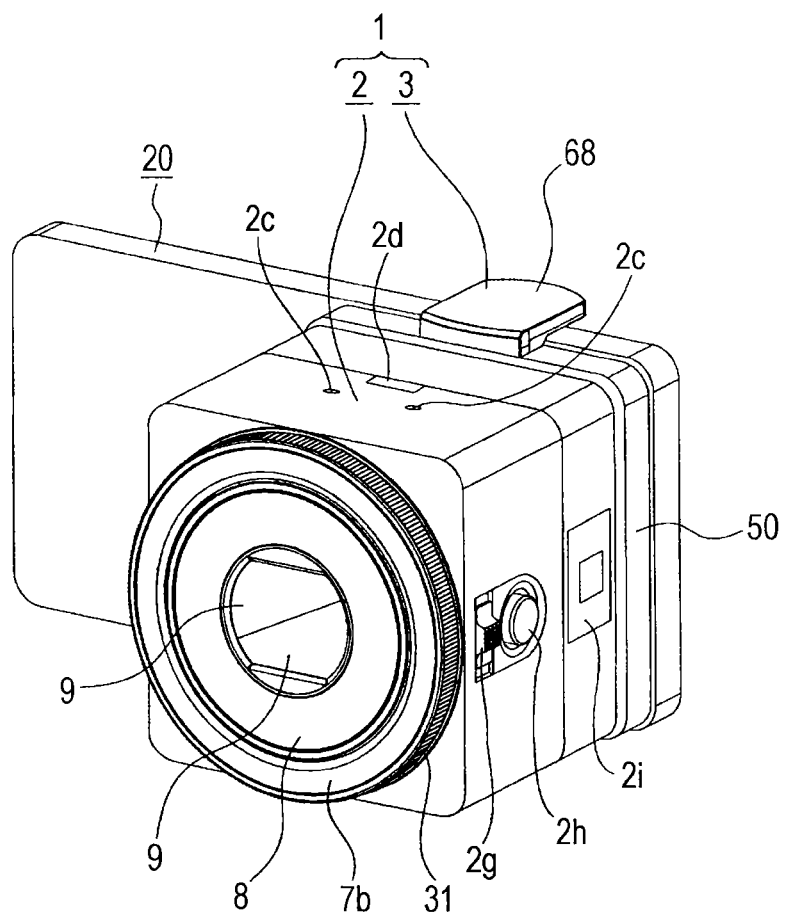
FIG. 18 is an explanatory view of a shape variation example of another embodiment.

Although the structure of the imaging unit 1 configured with the digital camera 2 and the adapter 3 has been described hitherto, various structures of the imaging unit 1 capable of being used while being attached to the communication terminal 20 in this manner are considered. Although the digital camera 2 is shown to have substantially cylindrical shape, the shape of the digital camera 2 is not limited thereto, and for example, as shown in FIG. 18, the shape of an outer casing may be a substantially rectangular parallelepiped shape. Of course, a substantially elliptic cylinder, a cylindrical shape using a partially notched circle, or the like is assumed.

It is also possible to consider that the internal configuration of the digital camera 2 is substantially the same as FIG. 4. However, in this case, the display unit 110 is a display unit 2j provided on the circumferential surface part 7a, but is not intended to display the taken image.

FIG. 19 shows a state transition diagram describing the series of operation of the imaging unit 1 described above in association with the operations of the communication terminal 20.

As shown in FIG. 19, if the communication terminal 20 which is unlocked and already started is moved close to the imaging unit 1 in a power OFF state, the digital camera 2 is powered ON (power ON) by NFC communication. Further, the NFC communication is performed not only in a case where the communication terminal 20 is moved close to the imaging unit 1, but also in a case where the digital camera 2 is mounted on the communication terminal 20 using the adapter 3 as described above.

However, at the time when the communication terminal 20 is moved close or mounted, the imaging preparation operation such as projecting the inner barrel part 8 is not performed.

Next, the communication terminal 20 receives Wi-Fi connection information and the like (the Wi-Fi Config and the AAR) from the digital camera 2 by NFC communication. If transmission of the connection information and the like is completed, the digital camera 2 performs the imaging preparation operation such as projecting the inner barrel part 8. On the other hand, the communication terminal 20 starts a predetermined application according to AAR and performs a Wi-Fi connection request to the digital camera 2 using the Wi-Fi Config. Then, if Wi-Fi connection between the communication terminal 20 and the digital camera 2 is completed, an associated function using Wi-Fi communication is performed.

Further, when the predetermined time has elapsed while the transmission of the connection information is not completed, as shown in FIG. 19, the digital camera 2 performs a power-OFF control, so that it is possible to suppress unnecessary power consumption when the digital camera is started by malfunction. Further, the inner barrel part 8 does not project even when the power is turned ON by malfunction, so that it is possible to prevent the lens from being damaged by projecting.

Accordingly, when the digital camera 2 is properly attached to the communication terminal 20 by the adapter 3, operations including a power-ON, transmission of connection information or the like by NFC communication, an imaging preparation operation, an cooperation by Wi-Fi connection are performed, but unnecessary operations are not performed in a case where the communication terminal 20 simply approaches instantaneously.

In addition, for the operation of FIG. 19, the digital camera 2 and the communication terminal 20 may perform processes described in FIGS. 5 and 7.

5. Conclusion

As described above, the digital cameras 10 and 2 according to the embodiments of the present disclosure perform a power-ON control if the communication terminal 20 is moved close thereto, and perform an imaging preparation operation such as projecting of a collapsible lens 13 or turning ON of the power lamp 12 after the transmission of Wi-Fi connection information by NFC communication is completed. This prevents the user from moving away the communication terminal 20 from the digital camera 10 before the transmission of Wi-Fi connection information is completed, thereby avoiding the Wi-Fi connection process from failing. In the case of the digital camera 2 capable of being used while being mounted on the communication terminal 20, when the user moves the digital camera 2 close to the communication terminal 20 without an intention to mount the digital camera 2, an advantage that unnecessary imaging operations and the like are not performed is achieved.

Further, even when the power is turned ON by malfunction, it is possible to suppress unnecessary power consumption by causing power to be turned OFF if transmission of Wi-Fi connection information by NFC communication is not completed. Further, since the collapsible lens 13 does not project when the power is turned ON, it is possible to prevent the collapsible lens 13 inside the housing from projecting and being damaged, because the power is turned ON by malfunction.

Although the preferred embodiments of the present disclosure have been described with reference to the accompanying drawings, the present technology however is not limited to such examples. It is obvious that various changes or modifications within the scope of the technical idea described in the claims shall be understood by a person having an ordinary skill in the art of the present disclosure to fall within the technical scope of the present disclosure.

For example, a computer program for exerting the functions of the digital camera 10 or the communication terminal 20 may be prepared in hardware such as a Central Processing Unit (CPU), a ROM, and a RAM, built into the digital camera 10 or the communication terminal 20. Further, a computer-readable storage medium storing the computer program is also provided.

Further, respective steps in the processes of the digital camera 10 and the communication terminal 20 in the present specification do not have to be processed in time series according to the orders disclosed in the accompanying flowcharts and sequence diagrams. For example, respective steps in the processes of the digital camera 10 and the communication terminal 20 may be processed in orders different from the orders described in the flowcharts and sequence diagrams, or may be processed in parallel. Specifically, for example, steps S209 and S215 in FIG. 7 may be processed in parallel or in a reverse order. Steps S233 and S236 to S251 in FIG. 7 may be processed in parallel or in a reverse order.

Further, the effects described herein are not limiting and are merely exemplary or illustrative. In other words, the technology according to the present disclosure may provide other effects obvious to those skilled in the art from the description herein, together with the effects described above or in place of the effects.

In addition, the present technology can be configured as follows.

(1) An imaging device including:
a non-contact communication unit that performs non-contact communication with an external device; and
a control unit that controls turning ON/OFF power and an imaging preparation operation of the imaging device,
wherein the control unit performs control of turning ON the power of the imaging device when detecting a polling command which is transmitted from the external device by the non-contact communication, of transmitting connection information regarding wireless communication connection with the external device to the external device after the power is turned ON, and of performing the imaging preparation operation when transmission of the connection information is completed.

(2) The imaging device according to (1),
wherein when the transmission of the connection information is not completed within a predetermined time after the power of the imaging device is turned ON, the control unit performs control of turning OFF the power of the imaging device.

(3) The imaging device according to (1) or (2),
wherein the control unit performs control of transmitting information for designating an application to be started in the external device together with the connection information.

(4) The imaging device according to any one of (1) to (3),
wherein when an operation of a power button by a user is detected, the control unit performs control of turning ON the power of the imaging device and of performing the imaging preparation operation.

(5) The imaging device according to any one of (1) to (4),
wherein the imaging preparation operation is an operation involved with a change in appearance or a start-up notification to the user.

(6) The imaging device according to (5),
wherein the imaging preparation operation involved with the change in appearance is a driving operation of a collapsible lens.

(7) The imaging device according to (5),
wherein the imaging preparation operation involved with the start-up notification to the user is a reproduction operation of start-up sound.

(8) The imaging device according to (5),
wherein the imaging preparation operation involved with the start-up notification to the user is a light emission operation of a power lamp.

(9) The imaging device according to any one of (1) to (8),
wherein the non-contact communication is NFC communication.

(10) The imaging device according to any one of (1) to (9),
wherein the wireless communication is Wi-Fi communication.

(11) A control method including:
detecting a polling command which is transmitted from an external device by non-contact communication;
performing control of turning ON power of an imaging device when the polling command is detected;
transmitting connection information regarding wireless communication connection with the external device to the external device after the power of the imaging device is turned ON; and
controlling a processor so as to perform an imaging preparation operation when transmission of the connection information is completed.

(12) A program causing a computer to function as:
a non-contact communication unit that performs non-contact communication with an external device; and
a control unit that controls turning ON/OFF power and an imaging preparation operation of an imaging device,
wherein the control unit performs control of turning ON power of the imaging device when detecting a polling command which is transmitted from the external device by the non-contact communication, of transmitting connection information regarding wireless communication connection with the external device to the external device after the power is turned ON, and of performing the imaging preparation operation when transmission of the connection information is completed.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
a non-contact communication circuit configured to perform non-contact communication with an external display device; and
a power circuit configured to be turned ON based on detecting a polling command which is transmitted from the external display device by the non-contact communication,
a control circuit configured to
control transmission, to the external display device, of configuration information regarding wireless communication connection with the external display device,
maintain a collapsible lens in a collapsed stated after power-on and during transmission of the configuration information, and
extend the collapsible lens after transmission of the configuration information is complete.

2. The imaging device according to claim 1, wherein the control circuit is further configured to perform control to turn OFF the power circuit, in a case that the transmission of the configuration information is not completed within a predetermined time after the power circuit is turned ON.

3. The imaging device according to claim 1, wherein the configuration information includes information related to requesting and authorizing the wireless communication connection to the external display device.

4. The imaging device according to claim 3, wherein an image transmitted from the imaging device to the external display device via the wireless communication connection is displayed on the external display device.

5. The imaging device according to claim 3, wherein application information is transmitted with configuration information.

6. The imaging device according to claim 5, wherein the configuration information includes identifier information.

7. The imaging device according to claim 1, wherein the control circuit is configured to perform control to turn ON the power based on detection of an operation of a power button by a user, and to extend the collapsible lens after turning ON the power circuit based on operation of the power button.

8. The imaging device according to claim 1, wherein the control circuit is further configured to reproduce a reproduction operation of a start-up sound after transmission of the configuration information is complete.

9. The imaging device according to claim 1, wherein the control circuit is further configured to cause a light emission operation of a power lamp after transmission of the configuration information is complete.

10. The imaging device according to claim 1, wherein the non-contact communication is a near field communication.

11. The imaging device according to claim 1, wherein the wireless communication is Wi-Fi communication.

12. The imaging device according to claim 1, wherein the control circuit is configured to maintain the collapsible lens in the collapsed state, in a case that the control circuit does not detect the polling command.

13. A control method comprising:
detecting a polling command which is transmitted from an external display device by non-contact communication;
performing control of causing a power circuit to be turned ON based on detection of the polling command;
transmitting, to the external display device, configuration information regarding wireless communication connection with the external display device;
controlling a processor to maintain a collapsible lens in a collapsed state after power-on and during transmission of the configuration information; and
controlling the processor to extend the collapsible lens after transmission of the configuration information is complete.

14. The control method according to claim 13, wherein the collapsible lens is maintained in the collapsed state in a case that the polling command is not detected.

15. A non-transitory computer-readable medium encoded with computer-readable instructions thereon, the computer-readable instruction when executed by a computer cause the computer to perform a method comprising:
performing non-contact communication with an external display device; and
causing the power circuit to be turned ON based on detecting a polling command which is transmitted from the external display device by the non-contact communication;
transmitting, to the external display device, configuration information regarding wireless communication connection with the external display device;
maintaining a collapsible lens in a collapsed stated after power-on and during transmission of the configuration information; and
extending the collapsible lens after transmission of the configuration information is complete.

16. The non-transitory computer-readable medium according to claim 15, wherein the collapsible lens is maintained in a collapsed state in a case that the polling command is not detected.

* * * * *